(12) United States Patent
Nagasawa et al.

(10) Patent No.: US 8,619,711 B2
(45) Date of Patent: Dec. 31, 2013

(54) WIRELESS COMMUNICATION APPARATUS

(75) Inventors: Chizuko Nagasawa, Yokohama (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 301 days.

(21) Appl. No.: 12/810,631

(22) PCT Filed: Dec. 26, 2008

(86) PCT No.: PCT/JP2008/073860
§ 371 (c)(1),
(2), (4) Date: Sep. 22, 2010

(87) PCT Pub. No.: WO2009/084689
PCT Pub. Date: Jul. 9, 2009

(65) Prior Publication Data
US 2011/0002308 A1 Jan. 6, 2011

(30) Foreign Application Priority Data

Dec. 27, 2007 (JP) .................................. 2007-337123
Jan. 30, 2008 (JP) .................................. 2008-019638
Jan. 30, 2008 (JP) .................................. 2008-019642

(51) Int. Cl.
*H04J 4/00* (2006.01)
(52) U.S. Cl.
USPC ........................................................ 370/331
(58) Field of Classification Search
None
See application file for complete search history.

(56) References Cited

U.S. PATENT DOCUMENTS

| 7,440,430 | B1 * | 10/2008 | Jagadeesan et al. | 370/331 |
| 2006/0056383 | A1 * | 3/2006 | Black et al. | 370/350 |
| 2006/0077994 | A1 * | 4/2006 | Spindola et al. | 370/412 |
| 2006/0088000 | A1 * | 4/2006 | Hannu et al. | 370/328 |
| 2006/0116075 | A1 * | 6/2006 | Gallo | 455/41.2 |
| 2011/0222423 | A1 | 9/2011 | Spindola et al. | |

FOREIGN PATENT DOCUMENTS

| JP | 2006-050488 | 2/2006 |
| JP | 2006-238445 | 9/2006 |
| JP | 2007-214985 | 8/2007 |
| KR | 2007-0064673 A | 6/2007 |
| WO | 2006-044696 | 4/2006 |

OTHER PUBLICATIONS

Notice of Grounds for Rejection dated Aug. 1, 2011, issued for counterpart Korean Patent Application No. 10-2010-7015722.

* cited by examiner

*Primary Examiner* — John Blanton
(74) *Attorney, Agent, or Firm* — Procopio, Cory, Hargreaves & Savitch LLP

(57) ABSTRACT

In order to perform handover from a first wireless communication network 15 to a second wireless communication network 16, a preparation time for handover, communication quality after scheduled handover execution, and a delay time of each of the first wireless communication network and the second wireless communication network are obtained by a handover control unit 36 in advance. Based on such information obtained and data amount in a jitter buffer 47 at a time of determination to start preparation for handover, a reproduction speed of an application being executed is controlled. Thereby, it is possible to perform handover to a different wireless communication network without deteriorating the reproduction quality and real-time property.

14 Claims, 22 Drawing Sheets

FIG. 4
(a)
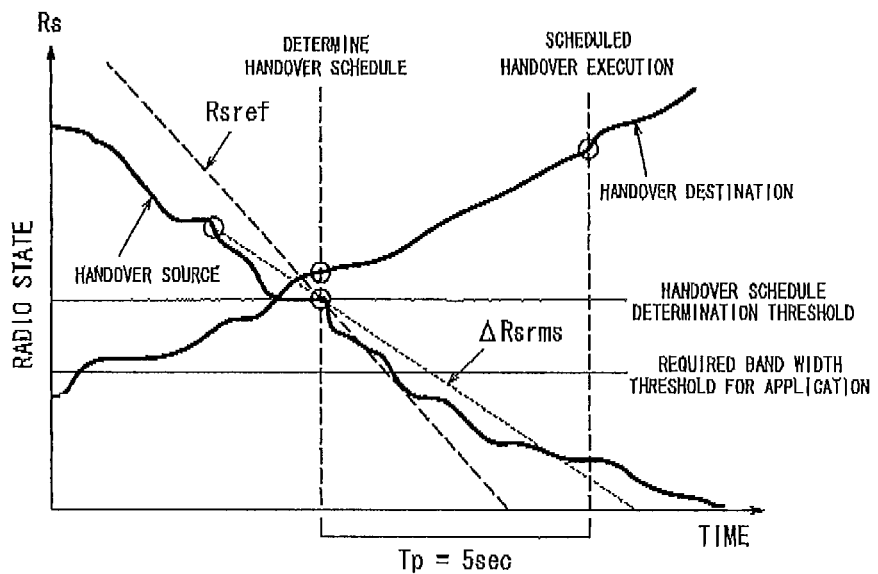
(b)
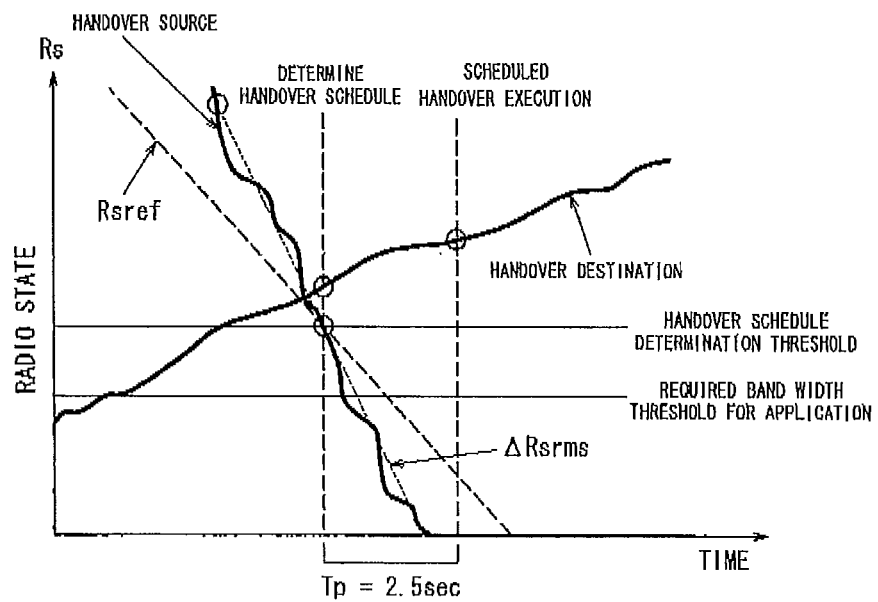

FIG. 7
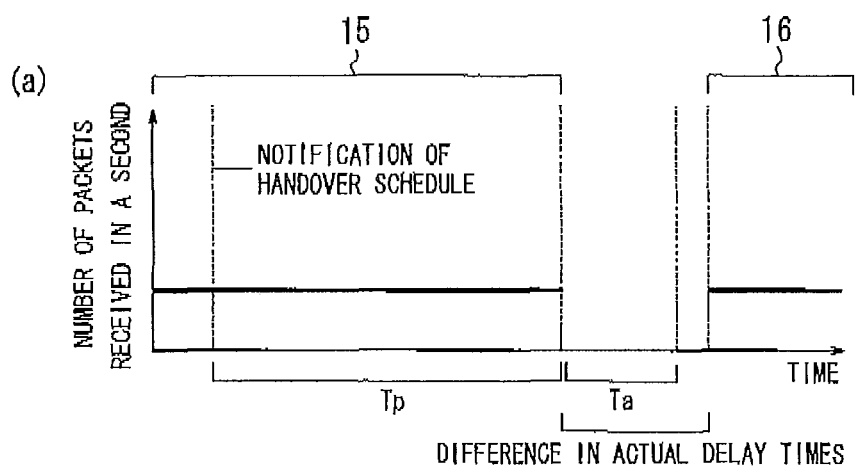
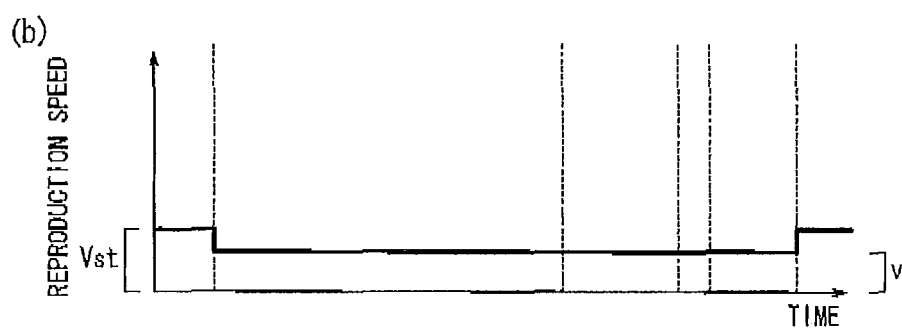
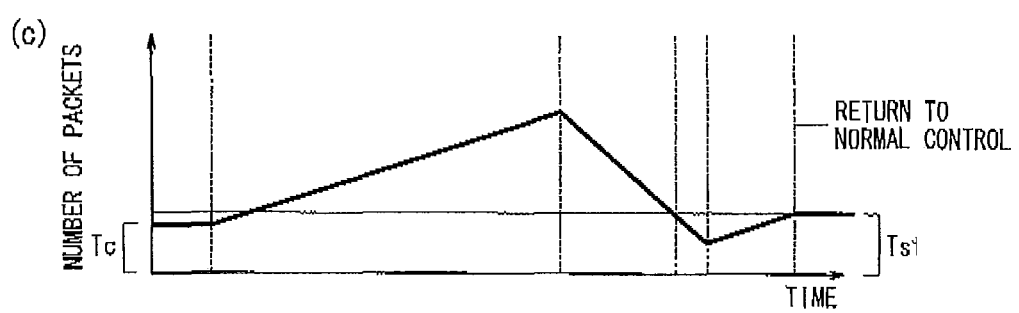

| COMMUNICATION QUALITY (RADIO STATE) | THROUGHPUT |
|---|---|
| RSSI EQUAL TO OR HIGHER THAN −60dBm | 200kbps |
| RSSI EQUAL TO OR HIGHER THAN −70dBm AND LESS THAN −60dBm | 150kbps |
| RSSI EQUAL TO OR HIGHER THAN −80dBm AND LESS THAN −70dBm | 100kbps |
| RSSI EQUAL TO OR HIGHER THAN −90dBm AND LESS THAN −80dBm | 60kbps |
| RSSI EQUAL TO OR HIGHER THAN −100dBm AND LESS THAN −90dBm | 30kbps |
| RSSI LESS THAN −100dBm | 0kbps |

WIRELESS COMMUNICATION APPARATUS

CROSS REFERENCE TO RELATED APPLICATION

This application claims priority to and the benefit of Japanese Patent Application No. 2007-337123 filed on Dec. 27, 2007, and Japanese Patent Application No. 2008-19638 and Japanese Patent Application No. 2008-19642 both filed on Jan. 30, 2008, the entire contents of which are incorporated herein by reference.

TECHNICAL FIELD

The present invention relates to wireless communication apparatus capable of performing handover between different wireless communication networks.

BACKGROUND ART

In recent years, IETF (Internet Engineering Task Force) has been considering an IP mobility scheme for seamless movement capable of performing handover between a plurality of different wireless communication networks, such as a cellular phone network, a wireless LAN and the likes, so as to achieve ubiquitous environment. As a specific protocol of the IP mobility scheme, there are Mobile IPv4 and Mobile IPv6 (which are abbreviated as Mobile IP, hereinafter) for supporting movement of an individual communication terminal, and NEMO (Network Mobility) for supporting mobility of a network as a unit.

Incidentally, when an application (hereinafter, abbreviated as APP appropriately) such as VoIP having a real-time property is executed via the wireless communication network, an allowable bandwidth of a wireless communication path changes depending on a propagation environment such as fading, and arrival intervals of packets received by the communication terminal are changed in accordance with a change of the allowable bandwidth.

For this reason, it is generally performed to provide the communication terminal with a jitter buffer so as to first store received packets in the jitter buffer and then read out the packets from the jitter buffer and reproduce the packets at intervals based on the application. Thereby, it absorbs deviation in the packets, that is, displacement of reproduction intervals of packets caused by displacement (jitter) of the arrival intervals of the packets, so as to prevent deterioration of reproduction quality such as reproduced sound quality and the likes. Moreover, when there is no packet in the jitter buffer since the jitter is large, and therefore silence occurs, or when too many packets are received in a short period to be stored in the jitter buffer, the communication terminal changes a reproduction speed, discards received packets, or changes a size of the jitter buffer.

On the other hand, a downlink absolute delay time of a packet received by the communication terminal, that is, a time (delay time) required for a packets transmitted from a counterpart communication terminal to be received via the wireless communication network differs depending on wireless communication networks. Thus, in a case where the communication terminal is a wireless communication apparatus which is moving and performs handover to a different wireless communication network, and if the downlink absolute delay time of a handover destination is longer than that of a handover source, for example, it causes a blank period not receiving a packet and corresponding to the difference between the downlink absolute delay times.

In such a case, if the blank period not receiving the packet is longer than a time necessary to read out a last packet (that is, a jitter buffer standard delay time), received from the wireless communication network of the handover source, from the jitter buffer when packets are read out from the jitter buffer at certain intervals based on the APP and reproduced at a certain reproduction speed, for example, there is no packet in the jitter buffer for a period of such exceeding time. As a result, since there is no packet to reproduce at least during this period, it causes silence and deteriorates reproduction quality.

FIG. 20 shows diagrams for explaining a control method of the jitter buffer in the above case. FIG. 20(a) shows the number of packets received by the jitter buffer for a unit period, FIG. 20(b) shows the reproduction speed (read-out intervals) of the packets from the jitter buffer, and FIG. 20(c) shows the number of packets in the jitter buffer. FIG. 21 shows flows of the packets in that case. In FIG. 21, "Transmission", "Reception" and "Reproduction" indicate a transmission liming of a packet by the counterpart communication terminal, a reception timing of the packet received by the jitter buffer of the wireless communication apparatus, and a reproduction timing of the packet (timing to read out the packet from the jitter buffer) by the wireless communication apparatus, respectively. Here, it is assumed that there is no deviation in received packets (displacement of arrival intervals) at a wireless communication network A of the handover source and a wireless communication network B of the handover destination.

As obvious from FIG. 20 and FIG. 21, no packet is reproduced for a time T=(TddnB−TddnA)−Tst), if a downlink absolute delay time TddnB in the wireless communication network B of the handover destination is longer than a downlink absolute delay time TddnA the wireless communication network A of the handover source and the difference (TddnB−TddnA) is longer than a jitter buffer standard delay time Tst, which is applied to received packets when there is a standard number of packets in the jitter buffer. In such a case, moreover, since packets are reproduced immediately after being received from the wireless communication network B of the handover destination, it is not possible to absorb jitter.

In order to improve such a defect at handover, there is suggested a jitter buffer control method, for example, to monitor a reception condition of packets and, when packets cannot be received at normal reception intervals, to control read-out of packets from the jitter buffer, that is, the reproduction speed of the packets (for example, Patent Document 1).

FIG. 22 shows diagrams for explaining the jitter buffer control method disclosed in Patent Document 1. In the same manner as FIGS. 20(a) to 20(c), FIGS. 22(a) to 22(c) respectively show the number of packets received by the jitter buffer for the unit period, the reproduction speed, and the number of packets in the jitter buffer. FIG. 23 shows flows of the packets in that case.

As shown in FIG. 22 and FIG. 23, in a case where packets cannot be received at previous reception intervals such as when handover is performed from the wireless communication network A with the downlink absolute delay time TddnA to the wireless communication network B with the downlink absolute delay time TddnB longer than TddnA, the reproduction speed of the packets in the jitter buffer is gradually reduced in accordance with increase in the reception intervals. When the reception intervals return to normal intervals thereafter, the reproduction speed is controlled to gradually increase to the normal reproduction speed in accordance with the number of packets in the jitter buffer.

Patent Document 1: Japanese Patent Laid-Open No. 2006-238445

SUMMARY OF INVENTION

Technical Problem

The jitter buffer control method disclosed in Patent Document 1, however, only controls the reproduction speed of packets currently stored in the jitter buffer to be gradually reduced when the packets cannot be received at the previous reception intervals. Therefore, there is concern that, when the downlink absolute delay time TddnB of the handover destination is relatively long, the reproduction speed is reduced too much, leading to deterioration of the reproduction quality. In VoIP, for example, since the reproduction speed changes largely from a speed of original voice, quality of reproduced voice is significantly deteriorated, making hard for a user to hear.

In addition, although FIG. 22 and FIG. 23 show an exemplified control when silence and the likes caused by no packet in the jitter buffer does not occur, it is practically unknown how long the reception intervals of the packets will be. It is thus concerned that, according to some jitter buffer standard delay time Tst and some downlink absolute delay time TddnB of the handover destination, the jitter buffer may become empty causing silence and the likes. Although the jitter buffer standard delay time Tst may be set longer so as to prevent silence, this causes delay in reproduction of packets from the counterpart terminal in VoIP, for example, which loses the real-time property.

Moreover, the jitter buffer control method disclosed in Patent Document 1 does not consider a radio state of the handover destination. Thus, it is concerned that, although handover is performed, when the radio state of the handover destination is not good, delay in the packets accumulates and the reproduction speed slows down after handover, causing deterioration in the reproduction quality.

In consideration of such problems, it is an object of the present invention to provide a wireless communication apparatus capable of performing handover to a different wireless communication network without deteriorating the reproduction quality and the real-time property.

Solution to Problem

In order to achieve the above object, a wireless communication apparatus according to a first aspect includes:

a wireless communication unit for executing wireless communication by connecting to a first wireless communication network and a second wireless communication network different from the first wireless communication network;

an execution unit for executing an application for real-time communication via the wireless communication unit;

a communication quality obtain unit for obtaining communication quality of a wireless link of the first wireless communication network during execution of the application by connecting to the first wireless communication network;

a determination unit for determining whether to start preparation for handover from the first wireless communication network to the second wireless communication network based on the communication quality obtained by the communication quality obtain unit;

an estimation unit, when the determination unit determines to start preparation for handover during execution of the application, for estimating a handover preparation time to start handover based on the communication quality obtained by the communication quality obtain unit;

a measuring unit for measuring a delay time of each of the first wireless communication network and the second wireless communication network when the determination unit determines to start preparation for handover; and a control unit for controlling a reproduction speed of the application by the execution unit based on the handover preparation time estimated by the estimation unit and the delay time of each of the first wireless communication network and the second wireless communication network measured by the measuring unit.

A second aspect of the present invention is that, in the wireless communication apparatus according to the first aspect, the control unit compares the delay time of the first wireless communication network and the delay time of the second wireless communication network and, when the delay time of the second wireless communication network is longer than the delay time of the first wireless communication network by a predetermined time or more, slows the reproduction speed of the application by the execution unit.

A third aspect of the present invention is that, in the wireless communication apparatus according to the second aspect, the control unit slows the reproduction speed of the application by the execution unit after starting preparation for handover.

A fourth aspect of the present invention is that, in the wireless communication apparatus according to the second aspect, the execution unit is provided with a jitter buffer and a jitter buffer monitoring unit for monitoring data amount in the jitter buffer, and the control unit, when the data amount in the jitter buffer monitored by the jitter buffer monitoring unit exceeds a predetermined amount after completion of handover to the second wireless communication network, returns the reproduction speed of the application to a normal speed.

Moreover, in order to achieve the above object, a wireless communication apparatus according to a fifth aspect includes:

a wireless communication unit for executing wireless communication by connecting to a first wireless communication network and a second wireless communication network different from the first wireless communication network;

an execution unit having a jitter buffer and a jitter buffer monitoring unit for monitoring data amount in the jitter buffer and for executing an application for real-time communication via the wireless communication unit;

a communication quality obtain unit for obtaining communication quality of a wireless link of the first wireless communication network during execution of the application by connecting to the first wireless communication network;

a determination unit for determining whether to start preparation for handover from the first wireless communication network to the second wireless communication network based on the communication quality obtained by the communication quality obtain unit;

an estimation unit, when the determination unit determines to start preparation for handover during execution of the application, for estimating a handover preparation time to start handover based on the communication quality obtained by the communication quality obtain unit;

a measuring unit for measuring a delay time of each of the first wireless communication network and the second wireless communication network when the determination unit determines to start preparation for handover; and a control unit for controlling to slows a reproduction speed of the application by the execution unit based on the handover preparation time estimated by the estimation unit, the delay time of each of the first wireless communication network and the second wireless communication network measured by the measuring unit, and the data amount in the jitter buffer monitored by the jitter buffer monitoring unit at a point when the determination unit determines to start preparation for handover.

A sixth aspect of the present invention is that, in the wireless communication apparatus according to the fifth aspect, the control unit slows the reproduction speed of the application by the execution unit such that the data amount in the jitter buffer becomes zero at a time to start receiving data from the second wireless communication network.

A seventh aspect of the present invention is that, in the wireless communication apparatus according to the sixth aspect, the control unit compares the delay time of the first wireless communication network and the delay time of the second wireless communication network and, when the delay time of the second wireless communication network is longer than the delay time of the first wireless communication network by a predetermined time or more, slows the reproduction speed of the application by the execution unit.

An eighth aspect of the present invention is that, in the wireless communication apparatus according to the seventh aspect, the control unit slows the reproduction speed of the application by the execution unit after starting preparation for handover.

A ninth aspect of the present invention is that, in the wireless communication apparatus according to the eighth aspect, the control unit, when the data amount in the jitter buffer monitored by the jitter buffer monitoring unit exceeds a predetermined amount after completion of handover to the second wireless communication network, returns the reproduction speed of the application to a normal speed.

Furthermore, in order to achieve the above object, a wireless communication apparatus according to a tenth aspect includes:

a wireless communication unit for executing wireless communication by connecting to a first wireless communication network and a second wireless communication network different from the first wireless communication network;

an execution unit having a jitter buffer and a jitter buffer monitoring unit for monitoring data amount in the jitter buffer and for executing an application for real-time communication via the wireless communication unit;

a communication quality obtain unit for obtaining communication quality of wireless links of the first wireless communication network and the second wireless communication network during execution of the application by connecting to the first wireless communication network;

a determination unit for determining whether to start preparation for handover from the first wireless communication network to the second wireless communication network based on the communication quality obtained by the communication quality obtain unit;

an estimation unit, when the determination unit determines to start preparation for handover during execution of the application, for estimating a handover preparation time to start handover and communication quality of the second wireless communication network after scheduled handover execution, based on the communication quality obtained by the communication quality obtain unit;

a measuring unit for measuring a delay time of each of the first wireless communication network and the second wireless communication network when the determination unit determines to start preparation for handover; and a control unit for controlling a reproduction speed of the application by the execution unit based on the handover preparation time estimated by the estimation unit, the communication quality of the second wireless communication network after scheduled handover execution predicted by the estimation unit, the delay time of each of the first wireless communication network and the second wireless communication network measured by the measuring unit, and the data amount in the jitter buffer monitored by the jitter buffer monitoring unit at a time when the determination unit determines to start preparation for handover.

An eleventh aspect of the present invention is that, in the wireless communication apparatus according to the tenth aspect, the control unit compares the delay time of the first wireless communication network and the delay time of the second wireless communication network and, when the delay time of the second wireless communication network is longer than the delay time of the first wireless communication network by a predetermined time or more, slows the reproduction speed of the application by the execution unit.

A twelfth aspect of the present invention is that, in the wireless communication apparatus according to the eleventh aspect, the control unit slows the reproduction speed of the application by the execution unit after starting preparation for handover.

A thirteenth aspect of the present invention is that, in the wireless communication apparatus according to the twelfth aspect, the estimation unit predicts transition of throughput of the second wireless communication system until it reaches a required bandwidth threshold to execute the application, as the communication quality of the second wireless communication network after scheduled handover execution, and the control unit controls the reproduction speed of the application by the execution unit such that the data amount in the jitter buffer becomes zero at a time to start reception of data from the second wireless communication network when the throughput predicted by the estimation unit reaches already the required bandwidth threshold at a scheduled time to execute handover, and controls the reproduction speed of the application by the execution unit such that the data amount in the jitter buffer becomes zero at a time when the predicted throughput reaches the required bandwidth threshold when the throughput predicted by the estimation unit does not reach the required bandwidth, threshold at a scheduled time to execute handover.

A fourteenth aspect of the present invention is that, in the wireless communication apparatus according to the twelfth aspect, the estimation unit, after determination to start preparation for handover by the determination unit, predicts the communication quality of each of the first wireless communication network and the second wireless communication network based on corresponding communication quality obtained by the communication quality obtain unit at different timings, and notifies the control unit of cancellation of preparation for the handover if the predicted communication quality of the first wireless communication system exceeds the predicted communication quality of the second wireless communication system after a predetermined time exceeding the handover preparation time, and the control unit, when being notified of cancellation of preparation for the handover by the estimation unit, controls so as to return the reproduction speed of the application by the execution unit to a normal reproduction speed.

Advantageous Effects on Invention

In order to perform handover from the first wireless communication network to the second wireless communication network, the wireless communication apparatus according to the first aspect previously obtains the preparation time for handover and the delay time of each of the first wireless communication network and the second wireless communication network. Thereby, when the delay time of the second wireless communication network of a handover destination is longer than that of the first wireless communication network of a handover source, for example, it enables to know for how long and how long after determination to start preparation for handover the packet will not arrive. In addition, in order to reproduce packets received from the first wireless communication network of the handover source even in a period packets do not arrive, the reproduction speed can be controlled so as to absorb a difference in the delay time between the first wireless communication network and the second wireless communication network, taking a long time from determination to start preparation for handover. It is thus possible to reproduce the packets at a speed close to a standard reproduction speed by reducing a difference from the standard reproduction speed, which enables handover from the first wireless communication network to the second wireless communication network without deteriorating the reproduction quality and a real-time property.

In order to perform handover from the first wireless communication network to the second wireless communication network, the wireless communication apparatus according to the fifth aspect previously obtains the preparation time for handover, the delay time of each of the first wireless communication network and the second wireless communication network, and the data amount in the jitter buffer at the time of determination to start preparation for handover and, based on such information obtained, controls to slow down the reproduction speed of the application. Accordingly, it is possible to extend a time to absorb the difference in the delay time by slowing down the reproduction speed such that the data amount in the jitter buffer becomes zero at a time to start receiving data from the second wireless communication network of the handover destination, for example. It is thus possible to reproduce the packets at a speed much closer to the standard reproduction speed, which enables handover from the first wireless communication network to the second wireless communication network without deteriorating the reproduction quality and the real-time property.

In order to perform handover from the first wireless communication network to the second wireless communication network, the wireless communication apparatus according to the tenth aspect previously obtains the preparation time for handover, the delay time of each of the first wireless communication network and the second wireless communication network, the data amount in the jitter buffer at the time of determination to start preparation for handover, and the communication quality of the second wireless communication system of the handover destination. Based on, such information obtained, the wireless communication apparatus controls the reproduction speed of the application. Thereby, when the delay time of the second wireless communication network of the handover destination is longer than that of the first wireless communication network of the handover source and the communication quality of the second wireless communication system of the handover destination is not good, for example, it is possible to accumulate the data in the jitter buffer before performing handover in consideration of accumulation of the delay times of received data after handover.

Accordingly, it is possible to reproduce the packets at a speed close to the standard reproduction speed while extending the time to absorb the difference in the delay times by slowing down the reproduction speed before and after handover, which enables handover from the first wireless communication network to the second wireless communication network without deteriorating the reproduction quality and the real-time property.

BRIEF DESCRIPTION OF DRAWINGS

FIG. 4 shows diagrams for explaining a calculation method of a handover preparation time by a handover control unit shown in FIG. 2;

FIG. 7 shows diagrams for explaining one example of control of a jitter buffer by the telephone function unit shown in FIG. 3;

Figure 1:
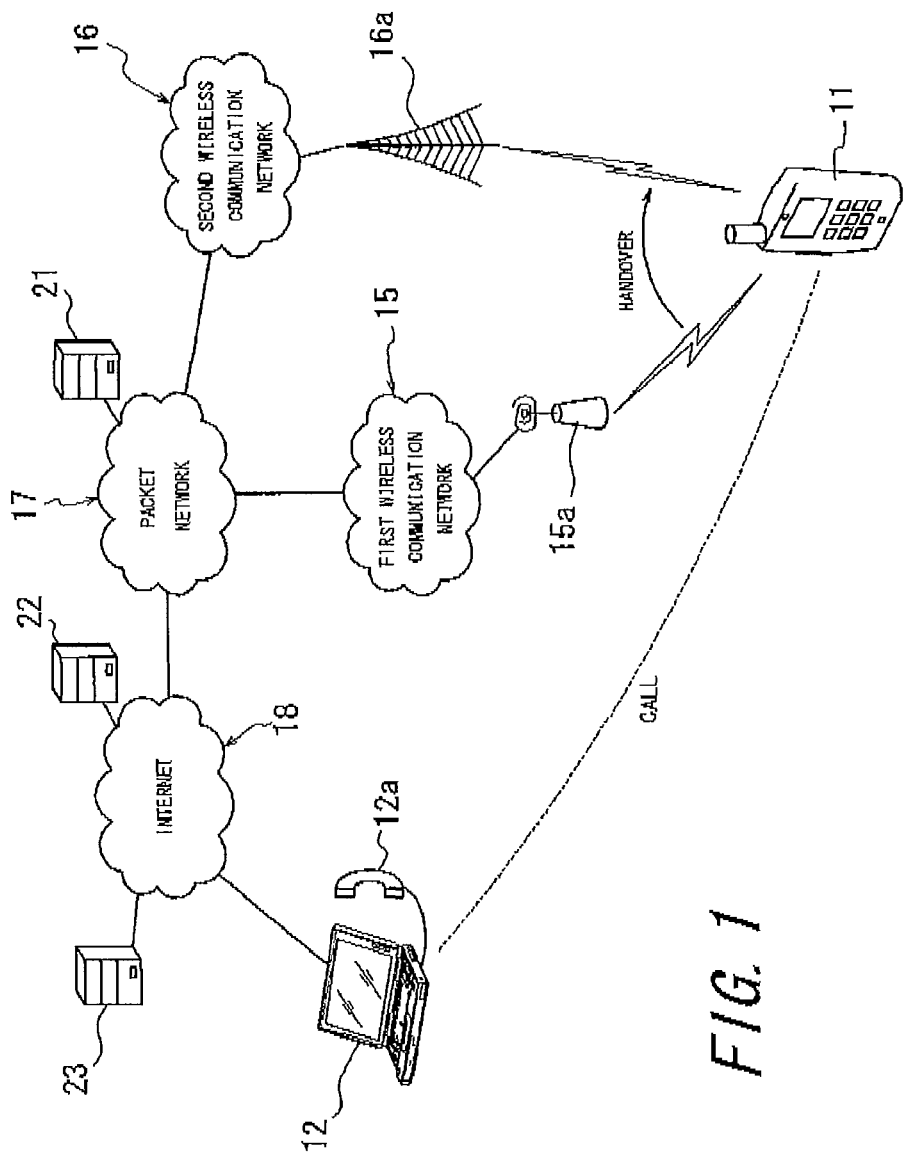
FIG. 1 shows a diagram illustrating a schematic constitution of a communication network which a wireless communication apparatus according to a first embodiment of the present invention can use.

REFERENCE SIGNS LIST 11 wireless communication apparatus
12 counterpart communication terminal
12a handset
15 first wireless communication network
15a access point
16 second wireless communication network
16a base station
17 packet network
18 internet
21, 22 SIP server
23 Home Agent (HA)
31 first wireless I/F
32 second wireless I/F
33 telephone function unit
34 communication processing unit
35 radio information obtain Unit
36 handover control unit
47 jitter buffer
50 jitter buffer monitoring unit
51 jitter buffer control unit
55 handover information obtain unit
56 reproduction speed calculation unit

DESCRIPTION OF EMBODIMENTS

Embodiments of the present invention will be described with reference to the accompanying drawings.

First Embodiment

FIG. 1 is a diagram illustrating a schematic constitution of an example of a communication network which a wireless communication apparatus according to a first embodiment of the present invention can use. FIG. 1 shows a case where a wireless communication apparatus 11, which is a mobile node, calls a counterpart communication terminal 12, which is a correspondent node, using VoIP, an application for real-time communication. The wireless communication apparatus 11 can perform handover between a first wireless communication network 15 and a second wireless communication network 16. The first wireless communication network 15 and the second wireless communication network 16 are connected to the internet 18 via a packet network 17.

Here, the first wireless communication network 15 may be constituted of a wireless LAN, for example, whereas the second wireless communication network 16 may be constituted of a mobile phone network such as cdma 2000 EV-DO, for example. A delay time (downlink absolute delay time) of the first wireless communication network 15 is shorter than the delay time (downlink absolute delay time) of the second wireless communication network 16. In FIG. 1, a reference sign 15a indicates an access point of the first wireless communication network 15, and a reference sign 16a indicates a base station of the second wireless communication network 16.

The counterpart communication terminal 12 may be a personal computer, for example, having a handset 12a connected thereto and a softphone installed therein, and is connected to the internet 18 via an internet service provider (not shown).

The packet network 17 and the internet 18 are connected to SIP (Session Initiation Protocol) servers 21 and 22 for controlling communication, respectively. Moreover, the internet 18 is connected to a Home Agent (HA) 23 for transferring received packets addressed to the wireless communication apparatus 11 to a wireless communication network to which the wireless communication apparatus 11 is connected.

In the communication network shown in FIG. 1, a home address used in the wireless communication network to which the wireless communication apparatus 11 originally belongs is registered to the HA 23, and a care-of address of the wireless communication network 16 of a handover destination is also registered to the HA 23 when performing handover. Thereby, the wireless communication apparatus 11 can perform handover between different wireless communication networks. Since such IP mobility techniques are known in systems of above Mobile IP and NEMO, detailed description thereof is omitted here.

In the present embodiment, for the sake of convenience in description, it is assumed that the wireless communication network to which the wireless communication apparatus 11 originally belongs is the first wireless communication network 15 and handover is performed from the first wireless communication network 15 to the second wireless communication network 16.

Figure 2:
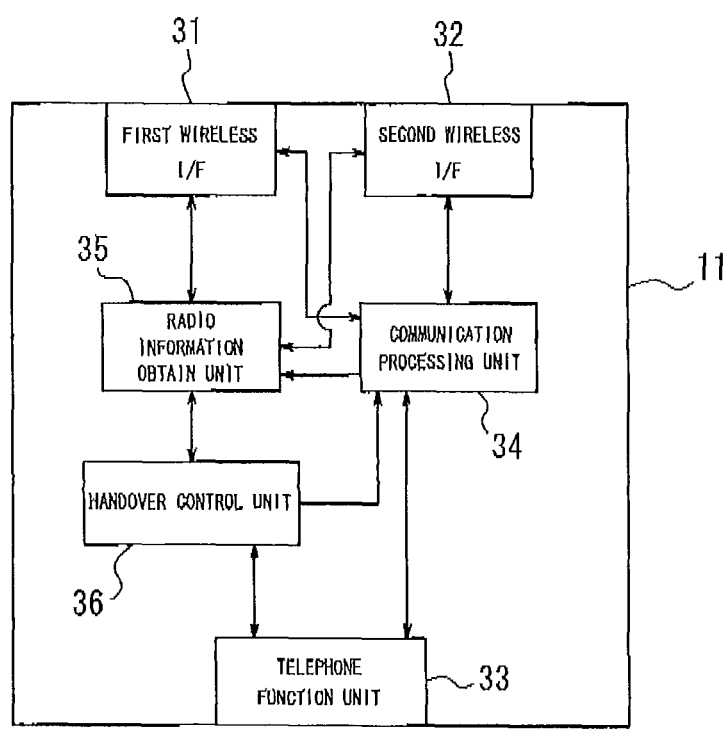
FIG. 2 shows a block diagram illustrating a schematic constitution of the wireless communication apparatus shown in FIG. 1.

FIG. 2 is a functional block diagram illustrating a schematic constitution of the wireless communication apparatus 11 according to the present embodiment shown in FIG. 1. The wireless communication apparatus 11 is provided with a first wireless I/F (interface) 31 corresponding to the first wireless communication network 15, a second wireless I/F 32 corresponding to the second wireless communication network 16, a telephone function unit 33 for executing an application of VoIP, a communication processing unit 34 for controlling connection to the fist wireless communication network 15 and the second wireless communication network 16, a radio information obtain unit 35 for obtaining radio information of the first wireless communication network 15 and the second wireless communication network 16, and a handover control unit 36 for controlling handover between the first wireless communication network 15 and the second wireless communication network 16.

The communication processing unit 34, together with the first wireless I/F 31 and the second wireless I/F 32, constitutes a wireless communication unit for executing wireless communication. The communication processing unit 34 controls connection of the first wireless I/F 31 or the second wireless I/F 32 such that the telephone function unit 33 and the counterpart communication terminal 12 communicate each other via the first wireless communication network 15 or the second wireless communication network 16 and communicate with the HA 23 under a control of the handover control unit 36.

The radio information obtain unit 35 obtains communication quality of the first wireless communication network 15 and the second wireless communication network 16 as radio information from the first wireless I/F 31 and the second wireless I/F 32, correspondingly, and provides the communication quality obtained to the handover control unit 36. Here, RSSI (Received Signal Strength Indicator) indicating a radio state is obtained as the communication quality. The radio information obtain unit 35 thus constitutes a communication quality obtain unit for obtaining the communication quality of a wireless link.

The handover control unit 36 determines whether to schedule handover, that is, whether to start preparation for handover, based on the communication quality provided by the radio information obtain unit 35, and then generates handover information including whether to cancel the determined handover schedule after determining the handover schedule, and controls handover based on the handover information.

Figure 3:
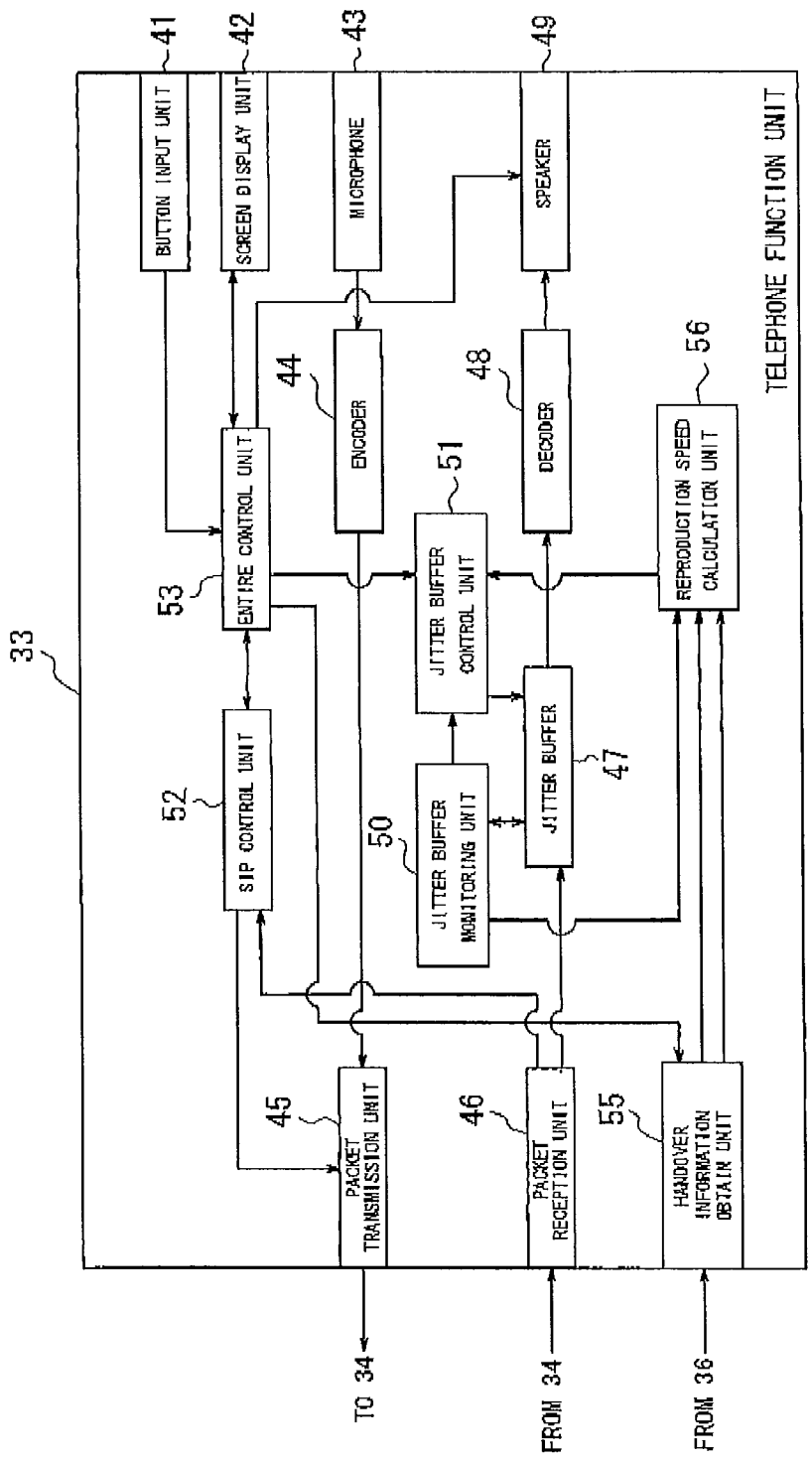
FIG. 3 shows a functional block diagram illustrating a schematic constitution of a telephone function unit of the wireless communication apparatus shown in FIG. 2.

FIG. 3 is a functional block diagram illustrating a schematic constitution of the telephone function unit 33 of the wireless communication apparatus 11 shown in FIG. 2. The telephone function unit 33 may be a softphone, for example, and similarly to a constitution of a known softphone, is provided with a button input unit 41, a screen display unit 42, a microphone 43, an encoder 44, a packet transmission unit 45, a packet reception unit 46, a jitter buffer 47, a decoder 48, a speaker 49, a jitter buffer monitoring unit 50, a jitter buffer control unit 51, an SIP control unit 52, and an entire control unit 53 for controlling operations entirely.

The entire control unit 53 obtains operation information by a user via the button input unit 41 or the screen display unit 42 and controls entire operations based on the information obtained. The SIP control unit 52 controls SIP procedure to start or end the call. During the call, audio data obtained from the microphone 43 are encoded by the encoder 44 and the encoded data are inserted in packets by the packet transmission unit 45 and transmitted to the counterpart communication terminal 12 via the communication processing unit 34.

Packets from the counterpart communication terminal 12 received by the packet reception unit 46 via the communication processing unit 34 are once stored in the jitter buffer 47 and then read out. Payloads of the packets read out are decoded by the decoder 48 and output as reproduced voice from the speaker 49. A packet reception condition of the jitter buffer 47 and the number of packets (data amount) in the jitter buffer 47 are monitored by the jitter buffer monitoring unit 50 and, based on a result of monitoring, the jitter buffer control unit 51 controls a read-out speed of the packets from the jitter buffer 47 and a process of discarding the received packets and the likes.

In the wireless communication apparatus 11 according to the present embodiment, the telephone function unit 33 is further provided with a handover information obtain unit 55 and a reproduction speed calculation unit 56. The handover information obtain unit 55 monitors the handover information from the handover control unit 36 at predetermined intervals to obtain information on whether there is a handover schedule. When there is the handover schedule, the handover information obtain unit 55 further obtains required handover information from the handover control unit 36 and provides the reproduction speed calculation unit 56 with the required handover information obtained.

The reproduction speed calculation unit 56, based on the required handover information obtained from the handover information obtain unit 55, determines whether to control the read-out speed of packets in the jitter buffer 47, that is a reproduction speed of the received packets (reproduction speed of VoIP application in the present embodiment). In a case to control as a result, the reproduction speed calculation unit 56 calculates a reproduction speed of the received packets based on the required handover information obtained and a result of monitoring the jitter buffer 47 by the jitter buffer monitoring unit 50, and provides a result of calculation to the jitter buffer control unit 51. Thereby, the jitter buffer control unit 51 controls read-out of the received packets from the jitter buffer 47 such that the reproduction speed of the received packets meets the reproduction speed calculated by the reproduction speed calculation unit 56. Accordingly, the telephone function unit 33 constitutes an execution unit for executing the application for real-time communication, as well as a control unit for controlling the reproduction speed of the application.

The following is a description of an operation of the wireless communication apparatus 11 according to the present embodiment.

The handover control unit 36 determines the handover schedule based on the communication quality obtained from the first wireless I/F 31 and the second wireless I/F 32. For example, when the communication quality obtained from the first wireless I/F 31 becomes lower than a handover schedule determination threshold and the communication quality obtained from the second wireless I/F 32 becomes equal to or higher than the handover schedule determination threshold during the call forming the wireless link with the first wireless communication network 15, the handover control unit 36 determines to schedule handover to the second wireless communication network 16, that is, determines to start preparation for handover. The communication quality of the second wireless communication network 16 not being used for the call is obtained (measured) by receiving notification information transmitted from the base station 16a, for example.

When determining the handover schedule, the handover control unit 36 obtains a handover preparation time Tp to start handover, downlink absolute delay time Tddn1 of a handover source in the wireless communication network being used currently (the first wireless communication network 15, in this case), a downlink absolute delay time Tddn2 of the handover destination in a wireless communication network to which handover will be performed (the second wireless communication network 16, in this case), and provides such information as the required handover information, together with information indicating that there is a handover schedule, to the telephone function unit 33. Accordingly, the handover control unit 36 constitutes a determination unit for determining whether to start preparation for handover, an estimation unit for estimating the handover preparation time, and a measuring unit for measuring the delay time of each of the first wireless communication network 15 and the second wireless communication network 16.

Next, methods for obtaining the handover preparation time Tp, the downlink absolute delay time Tddn1 of handover source, and the downlink absolute delay time Tddn2 of the handover destination by the handover control unit 36 are described.

(Method for Obtaining Handover Preparation time Tp)

The handover preparation time Tp, as shown in FIGS. 4(a) and 4(b), is calculated based on a change rate $\Delta Rs$ (slope) of a radio state (Rs) in a unit time which determines the communication quality. Here, although the change rate $\Delta Rs$ can be obtained by measuring at a time when the handover schedule is determined as the radio state becomes lower than the handover schedule determination threshold, an average change rate $\Delta Rsrms$ is obtained over a period from a predetermined time before the handover schedule is determined to the time the handover schedule is determined during the call in the present embodiment.

Consequently, the handover control unit 36 calculates the change rate ΔRs(t) of the radio state of the wireless communication network currently being used, by a formula 1 shown below at a predetermined timing, and stores a plurality of change rates ΔRs(t) to a predetermined time before (for example, 2 seconds before) in a memory. Then, when the handover schedule is determined, the handover control unit 36 calculates the average change rate ΔRsrms over a period to the predetermined time before, which are stored at the timing. Here, it is assumed that the radio state is gradually deteriorated.

[Formula 1]

$$\Delta Rs(t) = |\{Rs(t) - Rs(t-\Delta t)\}/\Delta t| \quad (1)$$

Subsequently, the handover control unit 36 determines whether the average change rate ΔRsrms calculated is smaller than a change rate threshold Rsref determined in advance. When ΔRsrms≤Rsref as a result, that is, when the radio state changes gently, the handover preparation time Tp is set to a reference Tref (5 seconds, for example) predetermined, as shown in FIG. 4(*a*).

In contrast, when ΔRsrms>Rsref as the result, that is, when the radio state changes rapidly, Tp=Tref(Rsref/ΔRsrms) is calculated, for example, and the handover preparation time Tp is set to be shorter than the reference time Tref, as the average change rate ΔRsrms is greater. FIG. 4(*b*) shows a case where ΔRsrms>Rsref and the handover preparation time Tp is set to be approximately half of the reference time Tref (2.5 seconds).

(Method for Obtaining the Absolute Delay Times Tddn1, Tddn2)

The downlink absolute delay time Tddn1 of the handover source and the downlink absolute delay time Tddn2 of the handover destination are obtained by one of first to fourth methods for obtaining the absolute delay time described below, for example. It is to be noted that, since the network between the counterpart communication terminal (CN: Correspondent Node) 12 and the HA 23 is not changed, the absolute delay time between them is not considered.

(a) First Method for Obtaining Absolute Delay Time

After determining the handover schedule, the handover control unit 36 controls the telephone function unit 33 and/or the communication processing unit 34 to require the HA 23, which is synchronized with the wireless communication apparatus 11, to transmit measuring packets having transmission time stamps. Thereby, the HA 23 transmits the measuring packets to both of the first wireless communication network 15 and the second wireless communication network 16. The wireless communication apparatus 11 receives the measuring packets transmitted from the HA 23 via the first wireless I/F 31 and the second wireless I/F 32, correspondingly, and measures the downlink absolute delay times Tddn1 and Tddn2 of corresponding networks based on reception times of the measuring packets and the time stamps of the measuring packets. When the downlink absolute delay time of the wireless communication network of the handover source can be measured from the packets received during the call, it is possible to omit transmission of the measuring packets to the wireless communication network of the handover source.

(b) Second Method for Obtaining Absolute Delay Time

After determining the handover schedule, the handover control unit 36 controls the telephone function unit 33 and/or the communication processing unit 34 to inform the HA 23, which is synchronized with the wireless communication apparatus 11, accordingly. Thereby, in the same manner as the first method for obtaining the absolute delay time described above, the HA 23 transmits the measuring packets to both of the first wireless communication network 15 and the second wireless communication network 16, so that the handover control unit 36 measures the downlink absolute delay times Tddn1 and Tddn2 of corresponding networks.

(c) Third Method for Obtaining Absolute Delay Time

After determining the handover schedule, the handover control unit 36 controls the telephone function unit 33 and/or the communication processing unit 34 such that the wireless communication apparatus 11 transmits measuring packets such as PING, RTCP and the likes to the HA 23, which is synchronized with the wireless communication apparatus 11, through both of the first wireless communication network 15 and the second wireless communication network 16, then receives responses and measures the downlink absolute delay times Tddn1 and Tddn2 of the corresponding networks.

(d) Fourth Method for Obtaining Absolute Delay Time

After determining the handover schedule, the handover control unit 36 obtains the absolute delay time of each of the wireless communication networks by using a handover scheme which has been considered by IEEE 802.21. The following is an exemplified method for obtaining the absolute delay time.

First, the method for obtaining the absolute delay time (Tddn1) of the first wireless communication network 15 is described below.

The wireless communication apparatus 11 obtains the following values stored in a first information server of the first wireless communication network 15.

A reference value (Tn3) of a one-way delay time from a measuring server (connecting to a backbone network of the internet 18, for example) which operates to measure the delay time to the access point 15*a* currently connected on the first wireless communication network 15

Reference values of downlink and uplink absolute delay times between the access point 15*a* and a terminal connecting thereto (downlink: Trdn3, uplink: Trup3)

Furthermore, the wireless communication apparatus 11 transmits the measuring packets such as PING and the likes to the HA 23 and receives the respond to measure a round-trip delay time Trt1 between the first wireless communication apparatus 11 and the HA 23.

Then, the absolute delay time Tddn1 of the first wireless communication network 15 is calculated from the above values by use of a formula 2 shown below. However, since the one-way delay time between the access point 15*a* and the HA 23 cannot be obtained, this one-way delay time is defined to be an approximate value of a sum of the Tn3 and {(Trt1−(Tn3+Trdn3+Tn3+Trup3)}/2.

[Formula 2]

$$Tddn1 = Tn3 + Trdn3 + \{Trt1 - (Tn3 + Trdn3 + Tn3 + Trup3)\}/2 \quad (2)$$

Next, a method for obtaining the absolute delay time (Tddn2) of the second wireless communication network 16 of the handover destination is described below.

The wireless communication apparatus 11 obtains the following values stored in a second information server connected to the second wireless communication network 16 of the handover destination via the first information server of the first wireless communication network 15. Location information of the wireless communication apparatus 11, obtained by the wireless communication apparatus 11 or the access point 15*a*, is transmitted to the second information server.

A reference value (Tn4) of a one-way delay time between the base station 16a, to which the wireless communication apparatus 11 is expected to connect, and the measuring server Reference values of downlink and uplink absolute delay times between the base station 16a and a terminal connecting thereto (downlink; Trdn4, uplink: Trup4)

Then, the absolute delay time Tddn2 of the second wireless communication network 16 is calculated from the above values by use of a formula 3 shown below. However, since a one-way delay time between the base station 16a and the HA 23 cannot be obtained, this one-way delay time is defined to be an approximate value of a sum of the Tn4 and {Trt1−(Tn3+Trdn3+Tn3+Trup3)}/2.

[Formula 3]

$$Tddn2=Tn4+Trdn4+\{Trt1-(Tn3+Trdn3+Tn3+Trup3)\}/2 \quad (3)$$

As described above, the handover control unit 36 obtains the handover preparation time TP, the downlink absolute delay time Tddn1 of the handover source; and the downlink absolute delay time Tddn2 of the handover destination and provides such obtained information to the telephone function unit 33.

Moreover, when the handover control unit 36 determines the handover schedule, the handover control unit 36 controls the wireless processing unit 34 such that the second wireless I/F 32 is connected to the second wireless communication network 16. Then, when the handover preparation time TP has passed, the handover control unit 36 transmits Registration Request (Binding Update for NEMO) via the second wireless communication network 16 of the handover destination to the HA 23 and registers the care-of address of the handover destination to the HA 23.

At that time, 8 bits of Registration Request Field of Registration Request message is set (using Multiple care of address in NEMO), so as to be able to communicate with either the first wireless communication network 15 or the second wireless communication network 16.

When the second wireless I/F 32 thereby receives Registration Reply (Binding Acknowledge for NEMO), which is handover completion information transmitted from the HA 23 in reply, the handover control unit 36 deregisters the care-of address of the first wireless communication network 15 of the handover source and disconnects. Thereafter, the handover control unit 36 controls the communication processing unit 34 so as to execute continuously the VoIP application via the second wireless communication network 16 of the handover destination, as well as providing the handover completion information received to the telephone function unit 33.

Figure 5:
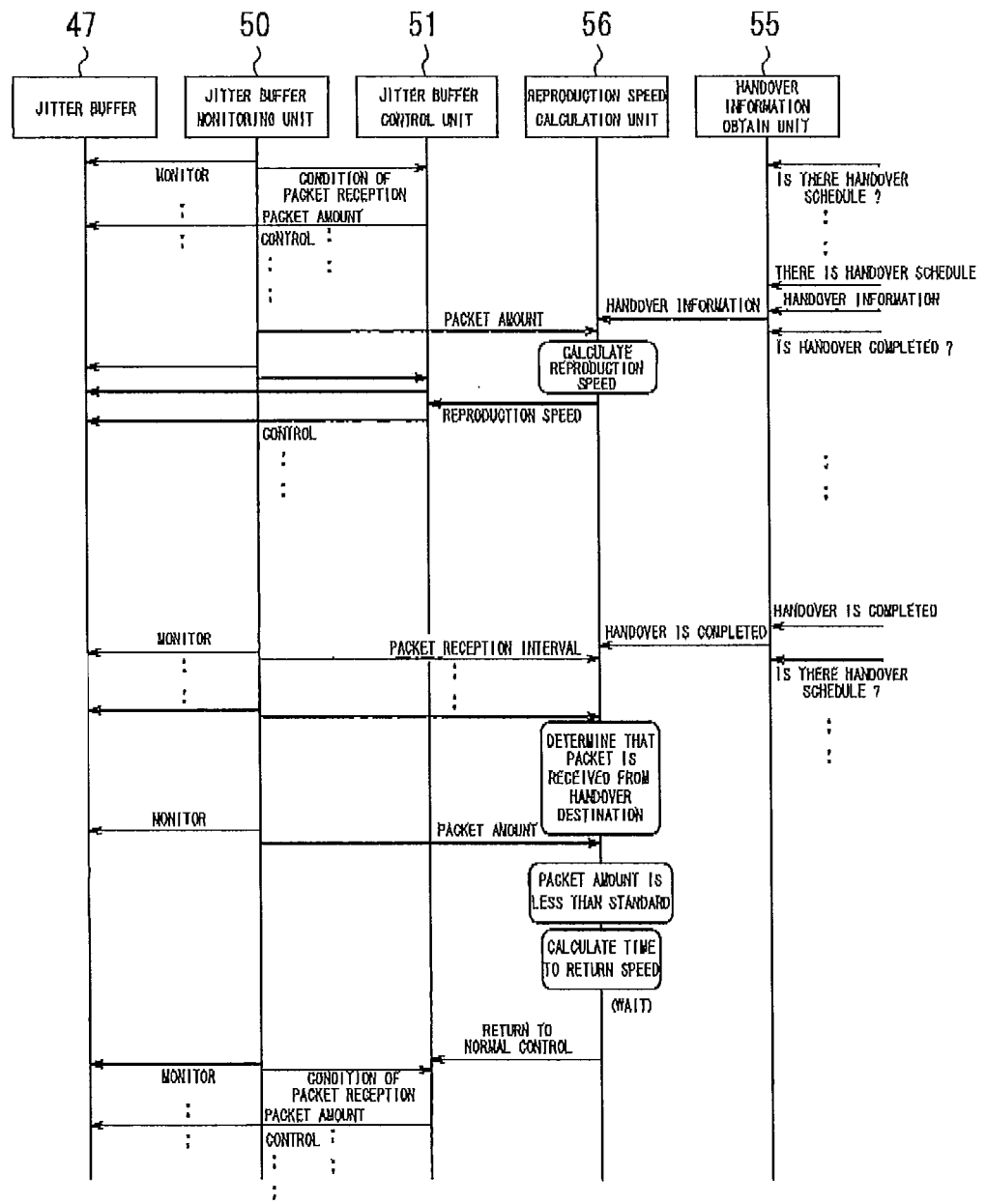
FIG. 5 shows a sequence diagram illustrating an operation of a main part of the telephone function unit shown in FIG. 3.

FIG. 5 is a sequence diagram illustrating an operation of a main part of the telephone function unit 33. The handover information obtain unit 55 monitors handover information from the handover control unit 36 at predetermined intervals. When obtaining information indicating that there is a handover schedule as a result, the handover information obtain unit 55 further obtains the handover preparation time TP, the downlink absolute delay time Tddn1 of the handover source, and the downlink absolute delay time Tddn2 of the handover destination, which are required handover information from the handover control unit 36, and provides the required handover information to the reproduction speed calculation unit 56.

The reproduction speed calculation unit 56 calculates a difference Ta (Ta=Tddn2−Tddn1) between the downlink absolute delay time (Tddn2) of the second wireless communication network 16 and the downlink absolute delay time (Tddn1) of the first wireless communication network 15 based on the required handover information obtained from the handover information obtain unit 55 and determines whether the difference exceeds a predetermined value (>0). When the difference exceeds the predetermined value, the reproduction speed calculation unit 56 calculates a reproduction speed v of the received packets M the jitter buffer 47 from a formula 4 shown below based on the required handover information obtained and a result of monitoring the jitter buffer 47 by the jitter buffer monitoring unit 50. In the formula 4, Vst indicates a standard reproduction speed, Tst indicates a jitter buffer standard delay time, which is the standard number of packets in the jitter buffer 47, and Tc indicates a time corresponding to the number of packets (data amount) in the jitter buffer 47 at a time of receiving the information indicating that there is a handover schedule, that is, a jitter buffer current delay time. In addition, the reproduction speeds V, Vst are shown by a time ratio (time/time) and Vst=1, for example.

[Formula 4]

$$V=\{Vst \cdot Tp-(Tst-Tc)\}/(Tp+Ta) \quad (4)$$

The reproduction speed calculation unit 56 provides the calculated reproduction speed V to the jitter buffer control unit 51. Thereby, the jitter buffer control unit 51 controls read-out of the received packets from the jitter buffer 47 so as to reproduce the received packets at the reproduction speed V slower than the standard reproduction speed Vst.

Here, the jitter buffer control unit 51 controls the reproduction speed of the received packets by a first reproduction speed control method or a second reproduction speed control method described below.

(a) First Reproduction Speed Control Method

It is defined as TR=TR1/V, provided that a packet read-out interval from the jitter buffer 47 corresponding to the standard reproduction speed Vst is TR1 and a packet read-out interval from the jitter buffer 47 corresponding to the reproduction speed V calculated is TR. For example, in case of the VoIP application reading and reproducing the packets in the jitter buffer 47 at intervals of 20 msec at the standard reproduction speed Vst, when the reproduction speed V is determined as 80% of the standard reproduction speed Vst (V=0.8), the packet read-out interval TR from the jitter buffer 47 is shown as TR=20/0.8 (msec).

(b) Second Reproduction Speed Control Method

When control of the reproduction speed for handover is started, a time stamp of a packet (a first packet) reproduced immediately after and a reproduction time thereof are recorded in combination. Packets thereafter are read out from the jitter buffer 47 and reproduced at a time Tv shown in a formula 5 below. In the formula 5, TD is a delay time whose default value is zero.

[Formula 5]

$$Tv=(\text{time stamp of packet}-\text{time stamp of first packet})+(\text{reproduction time of first packet}+TD) \quad (5)$$

Figure 6:
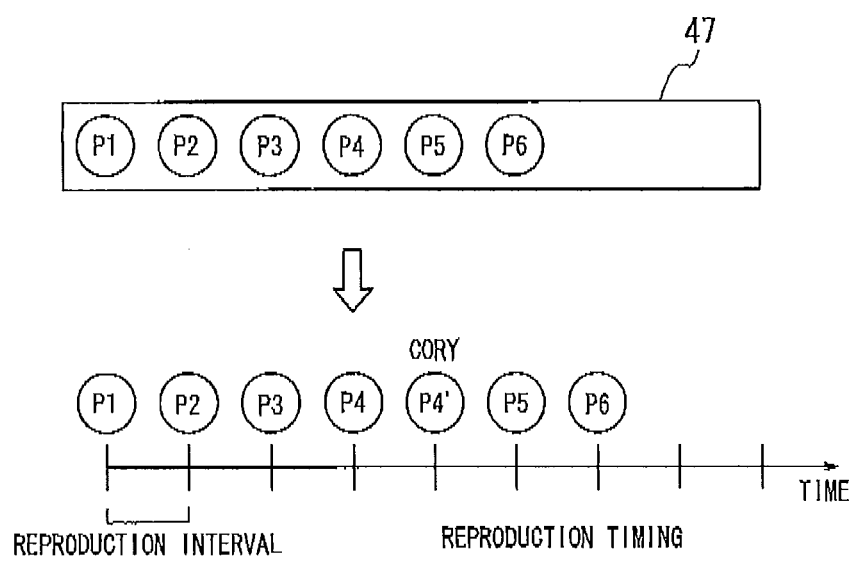
FIG. 6 shows a diagram for explaining an example of a reproduction speed control method of received packets, by a jitter buffer control unit shown in FIG. 3.

When the packets are read out from the jitter buffer 47, the packet read out at [{Vst/(Vst−v)}−1] is copied and stored in a memory of the decoder 48. After an original packet is reproduced, a copied packet is read out and reproduced at next reproduction timing. For example, when the reproduction speed V is defined as 80% of the standard reproduction speed Vst, 4 packets P1 to P4 in the jitter buffer 47 are read out and reproduced in sequence as shown in FIG. 6, and the fourth packet P4 is copied and a copied packet P4' is reproduced at the next reproduction timing after reproduction of the original packet P4. Subsequently, in order to read out a packet P5 from the jitter buffer 47, TD in the above formula 5 is increased as long as the time of reproduction interval by copy. When the packet to be read out at [{Vst/(Vst−v)}−1] is not in the jitter buffer 47 for a reason that it has not been received yet or it has been discarded, the same processing is performed to a packet of the next reproduction timing.

As described above, the jitter buffer control unit 51 controls the reproduction speed of the received packets. Then, when the handover information obtain unit 55 obtains the handover completion information from the handover control unit 36, the reproduction speed calculation unit 56 obtains reception intervals of the packets at predetermined intervals. Subsequently, reproduction speed calculation unit 56 calculates an average value of packet reception intervals obtained for a predetermined period and monitors whether a difference between the average value of the packet reception intervals calculated and a standard reception intervals of the VoIP application falls in a threshold.

When the difference falls in the threshold as a result, the reproduction speed calculation unit 56 determines that the packet is received from the handover destination and obtains the number of packets (data amount) in the jitter buffer 47 at that timing from the jitter buffer monitoring unit 50 and then determines whether the number of packets obtained exceeds a predetermined amount.

When the number of packets in the jitter buffer 47 does not exceed the predetermined amount as a result, the reproduction speed calculation unit 56 instructs the jitter buffer control unit 51 to return to a normal reproduction speed control after t=(Tst−Tc)/(Vst−V). In contrast, when the number of packets in the jitter buffer 47 exceeds the predetermined amount, the reproduction speed calculation unit 56 instructs the jitter buffer control unit 51 to return to the normal reproduction speed control immediately. That is, when the reproduction speed calculation unit 56 determines that the packets are received from the handover destination, the jitter buffer control unit 51 controls read-out from the jitter buffer 47 so as to return to the standard reproduction speed Vst when the number of the packets in the jitter buffer 47 exceeds the predetermined amount.

FIG. 7 shows diagrams for explaining a control method of the jitter buffer 47, in a case to return to the normal reproduction speed control after t=(Tst−Tc)/(Vst−V) since determination that the packet is received from the handover destination. In FIG. 7, (a) shows the number of packets received by the jitter buffer 47 in the unit time, (b) shows the reproduction speed (read-out interval) of the packets from the jitter buffer 47, and (c) shows the number of packets in the jitter buffer 47.

Figure 8:
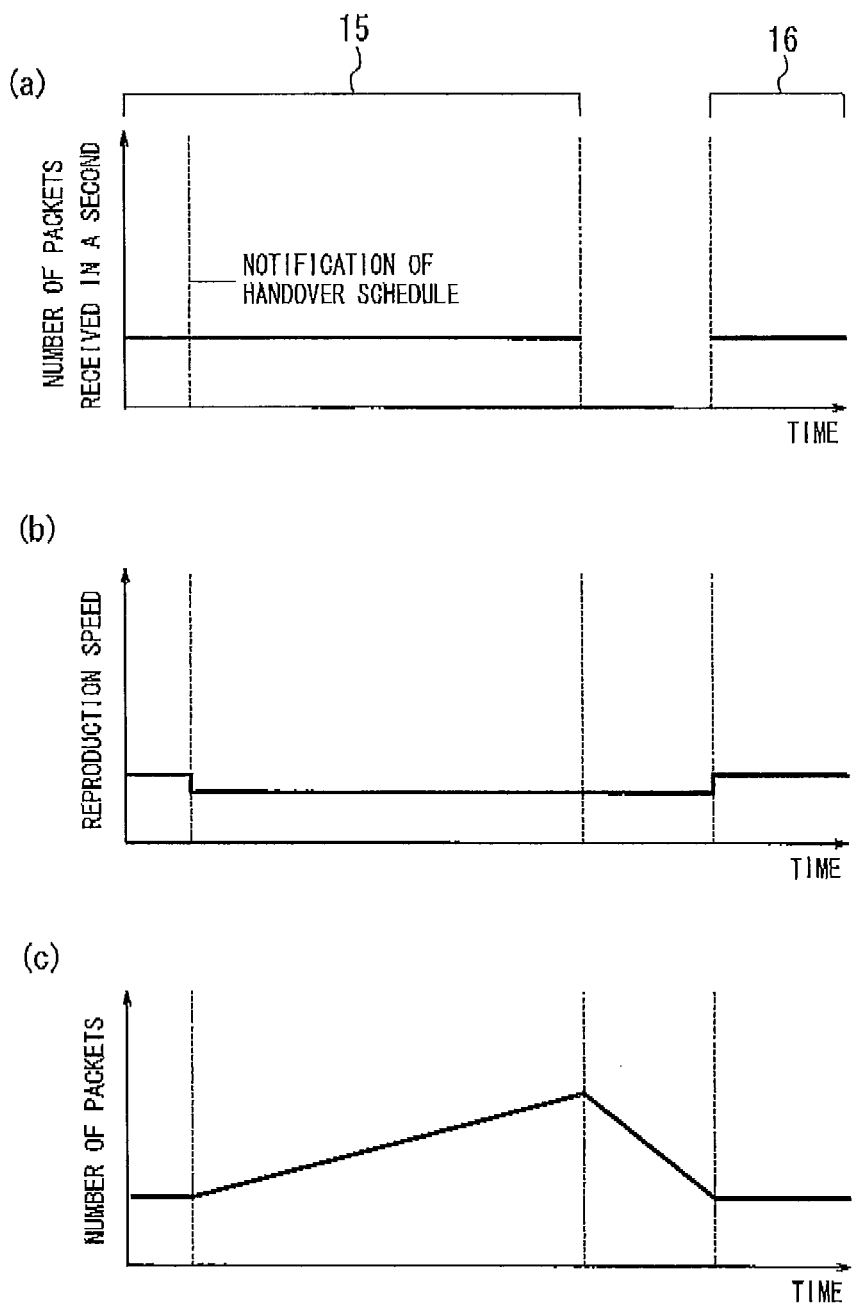
FIG. 8 shows diagrams for explaining another example of control of the jitter buffer by the telephone function unit shown in FIG. 3.
Figure 9:
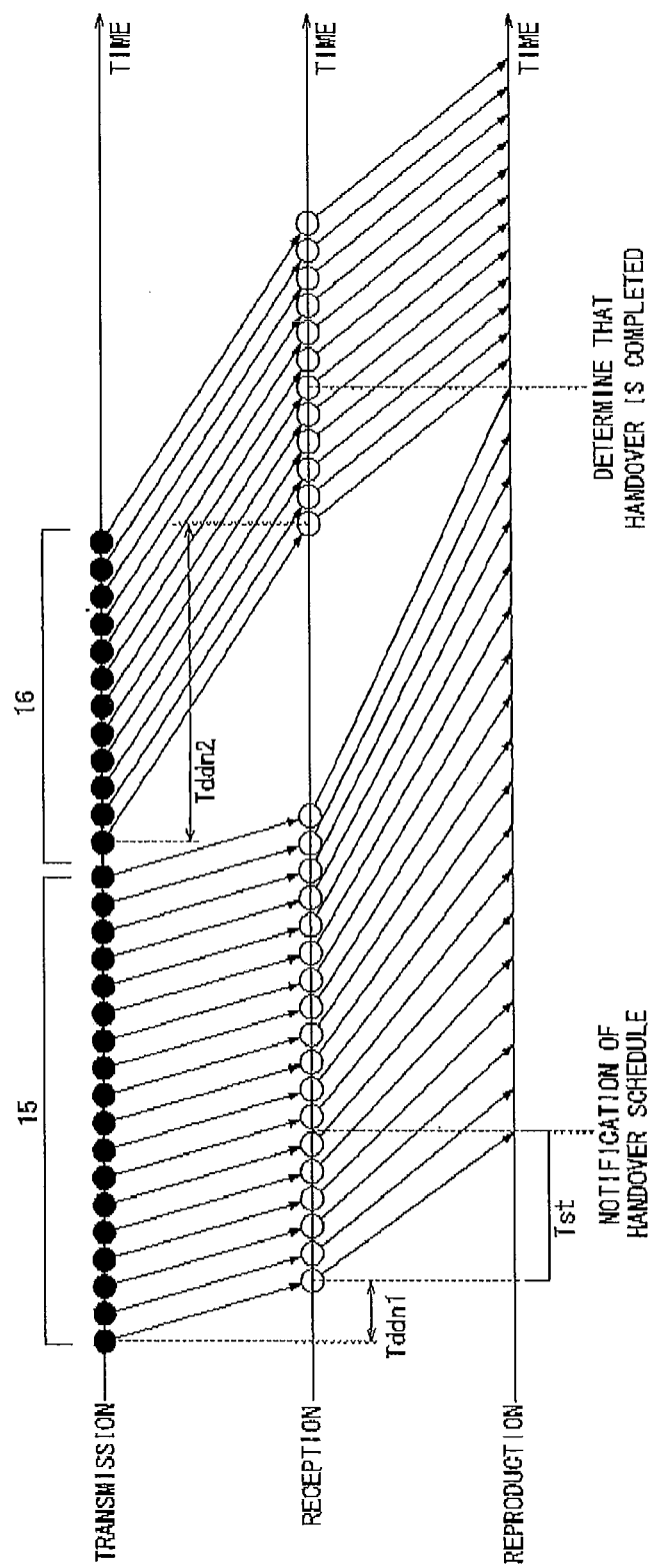
FIG. 9 shows a diagram illustrating flows of the packets by the example of control shown in FIG. 8.

FIG. 8 and FIG. 9 are diagrams for explaining a control method of the jitter buffer 47 in a case to return to the normal reproduction speed control immediately after determination that the packet is received from the handover destination. FIGS. 8(a) to 8(c), in the same manner as FIGS. 7(a) to 7(c), show the number of packets received by the jitter buffer 47 in the unit time, the reproduction speed (read-out interval) of the packets from the jitter buffer 47, and the number of packets in the jitter buffer 47, respectively.

FIG. 9 shows flows of packets, and "Transmit" indicates transmission timings of packets by the counterpart communication terminal 12, "Reception" indicates reception timings of the packets received by the jitter buffer 47 of the wireless communication apparatus 11, and "Reproduction" indicates reproduction timings of the packets (timing to read out the packets from the jitter buffer 47) by the wireless communication apparatus 11. It is to be noted that it is assumed here that there is no deviation in the received packets (displacement of the arrival intervals) in both of the first wireless communication network 15 of the handover source and the second wireless communication network 16 of the handover destination.

According to the wireless communication apparatus 11 of the present embodiment, in order to perform handover from the first wireless communication network 15 having the absolute delay time Tddn1, which is short, to the second wireless communication network 16 having the absolute delay time Tddn2, which is long, the preparation time Tp to start handover and the absolute delay times Tddn1 and Tddn2 are obtained in advance. It is thus possible to know for how long and how long after determination of start to prepare for handover the packet will not arrive. Then, the reproduction speed V is controlled to absorb the absolute delay time difference Ta (Ta=Tddn2−Tddn1) between the first wireless communication network 15 and the second wireless communication network 16, by taking a long time from the time of determining to start preparation for handover, so as to reproduce the packets received from the first wireless communication network 15 of the handover source even in a period there is no packets arriving. It thereby reduces a difference from the standard reproduction speed Vst.

Accordingly, it is possible to reduce influence on reproduced voice by jitter caused by handover and to prevent silence even when the jitter is larger than that expected because of deterioration of the radio state by slowing the reproduction speed down in advance, which enables handover from the first wireless communication network 15 to the second wireless communication network 16 without deteriorating the reproduction quality and the real-time property.

Second Embodiment

According to a second embodiment of the present invention, a wireless communication apparatus 11 has the constitution as described in the first embodiment, and when the absolute delay time difference Ta (Ta=Tddn2−Tddn1) exceeds the predetermined value (>0) when handover is performed from the first wireless communication network 15 to the second wireless communication network 16, controls read-out of the received packets from the jitter buffer 47 such that the number of packets (data amount) in the jitter buffer 47 becomes zero at a time to start receiving the packets from the second wireless communication network 16 of the handover destination.

Accordingly, the reproduction speed calculation unit 56 of the telephone function unit 33 calculates the reproduction speed V of the received packets in the jitter buffer 47 from a formula 6 shown below based on the required handover information obtained from the handover information obtain unit 55 and the result of monitoring the jitter buffer 47 by the jitter buffer monitoring unit 50.

[Formula 6]

$$V=(Tc+Tp\times Vst)/(Tp+Ta) \qquad (6)$$

The reproduction speed calculation unit 56 provides the reproduction speed V calculated to the jitter buffer control unit 51. Thereby, the jitter buffer control unit 51 controls read out of the received packets from the jitter buffer 47 so as to reproduce the received packets at the reproduction speed V slower than the standard reproduction speed Vst. It is to be noted that the reproduction speed control of the received packets by the jitter buffer control unit 51 may be performed by the first reproduction speed control method or the second reproduction speed control method described in the first embodiment.

Then, when the handover information obtain unit 55 obtains the handover completion information from the handover control unit 36, the reproduction speed calculation unit 56 obtains packet reception intervals at predetermined intervals and calculates an average value of the packet reception intervals obtained for a predetermined period. The reproduction speed calculation unit 56 then monitors whether the difference between the average value of the packet reception intervals calculated and the standard reception intervals of the VoIP application falls in a threshold.

When the difference falls in the threshold as a result, the reproduction speed calculation unit 56 determines that the packet is received from the handover destination and obtains the number of packets (data amount) in the jitter buffer 47 at that time from the jitter buffer monitoring unit 50 and determines whether the number of packets obtained exceeds a predetermined amount.

When the number of packets in the jitter buffer 47 does not exceed the predetermined amount as a result, the reproduction speed calculation unit 56 instructs the jitter buffer control unit 51 to return to the normal reproduction speed control after the number of packets exceeds the predetermined amount, that is, after $t=(Tst-Tc)/(Vst-V)$. In contrast, when the number of packets in the jitter buffer 47 exceeds the predetermined amount, the reproduction speed calculation unit 56 instructs the jitter buffer control unit 51 to return to the normal reproduction speed control immediately. That is, when the reproduction speed calculation unit 56 determines that the packets are received from the handover destination, the jitter buffer control unit 51 controls read out from the jitter buffer 47 so that the reproduction speed returns to the standard reproduction speed Vst when the number of packets in the jitter buffer 47 exceeds the predetermined amount.

Figure 10:
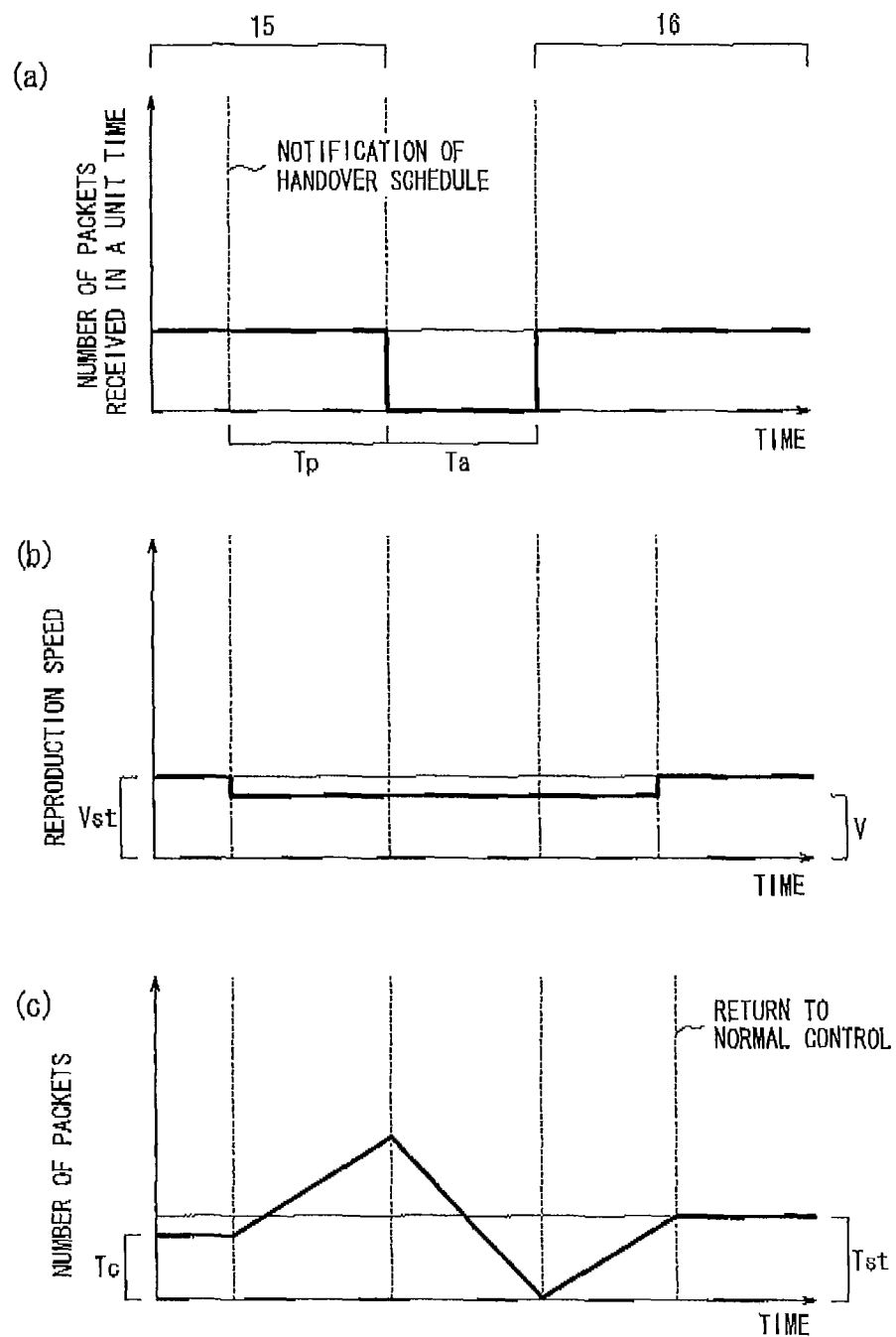
FIG. 10 shows diagrams for explaining an example of control of a jitter buffer of a wireless communication apparatus according to a second embodiment of the present invention.

FIG. 10 shows diagrams for explaining a control method of the jitter buffer 47 according to the present embodiment. In FIG. 10, (a) shows the number of packets received by the jitter buffer 47 in the unit time, (b) shows the reproduction speed (read-out interval) of the packets from the jitter buffer 47, and (c) shows the number of packets in the jitter buffer 47.

Figure 11:
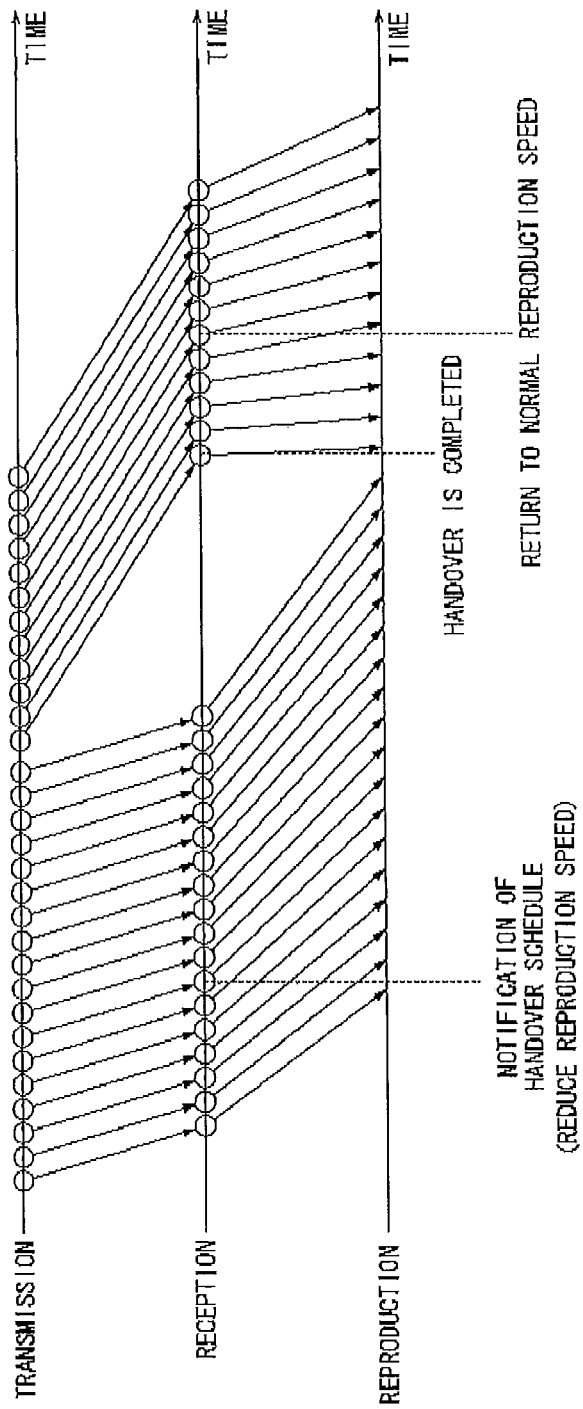
FIG. 11 shows a diagram illustrating flows of the packets by the example of control shown in FIG. 10.

FIG. 11 shows flows of packets according to the present embodiment, and "Transmit" indicates transmission timings of packets by the counterpart communication terminal 12, "Reception" indicates reception timings of the packets received by the jitter buffer 47 of the wireless communication apparatus 11, and "Reproduction" indicates reproduction timings (timings to read out the packets from the jitter buffer 47) of the packets by the wireless communication apparatus 11. It is to be noted that it is assumed here that there is no deviation in the received packets (displacement of the arrival intervals) in both of the first wireless communication network 15 of the handover source and the second wireless communication network 16 of the handover destination. Other constitutions and operations are same as those of the first embodiment and descriptions thereof are thus omitted.

As described above, the wireless communication apparatus 11 according to the present embodiment, in order to perform handover from the first wireless communication network 15 having the absolute delay time Tddn1, which is short, to the second wireless communication network 16 having the absolute delay time Tddn2, which is long, previously obtains the preparation time Tp to start handover, the absolute delay times Tddn1 and Tddn2, and the number of packets (data amount) in the jitter buffer 47 at the time of deciding the handover schedule. Based on the information obtained, the reproduction speed of the application after determination of the handover schedule is reduced from the standard reproduction speed Vst to the reproduction speed V, which is a constant speed at which the number of the packets in the jitter buffer 47 becomes zero at the time to start receiving the packets from the handover destination.

Figure 22:
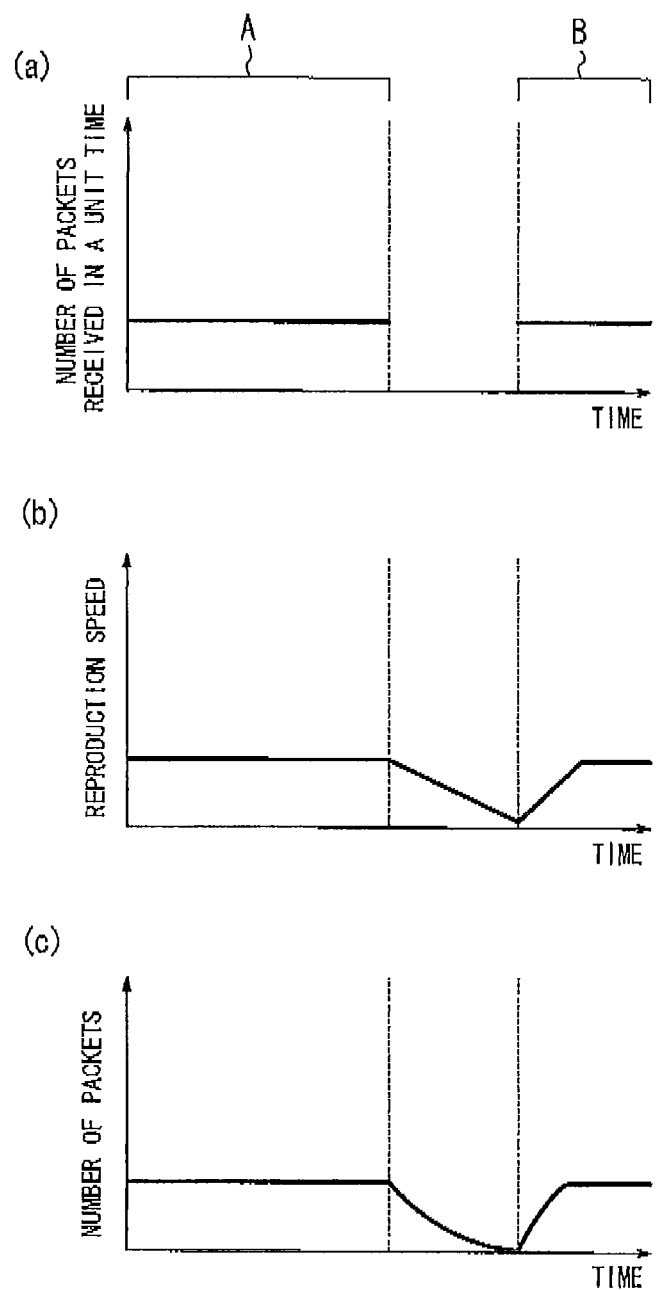
FIG. 22 shows diagrams for explaining another example of the conventional control method of the jitter buffer.
Figure 23:
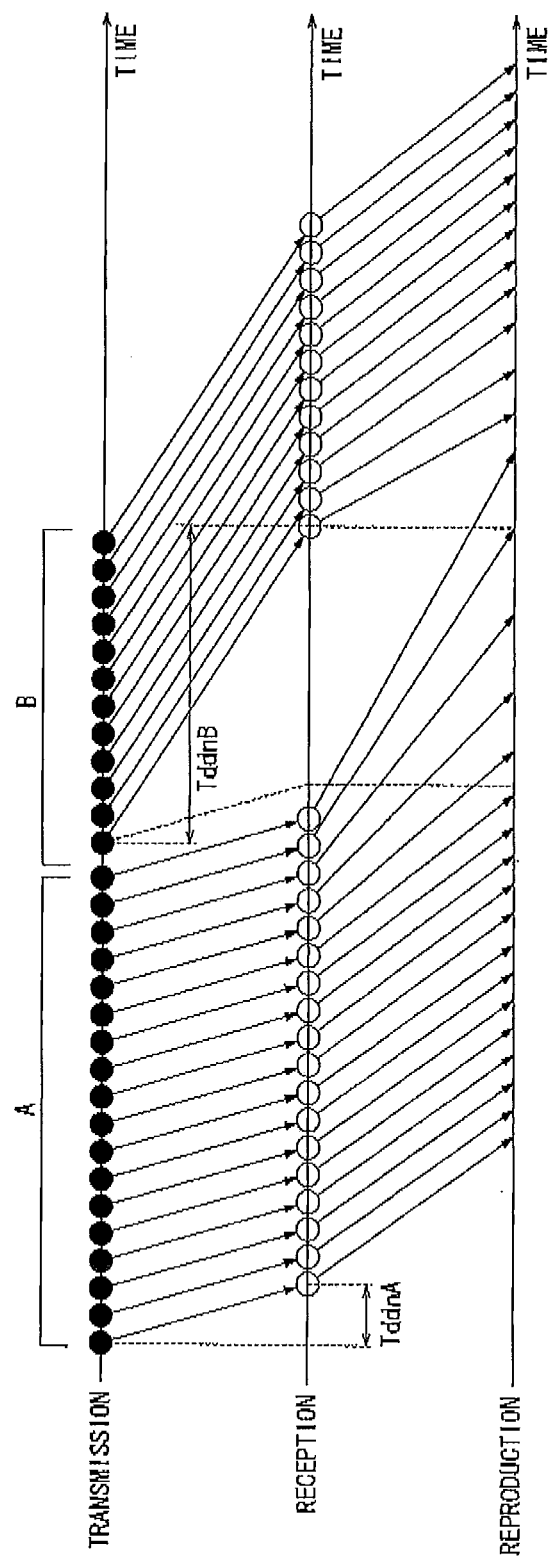
FIG. 23 shows a diagram illustrating flows of the packets by the control method shown in FIG. 22.

Then, when the number of packets exceeds the predetermined amount based on the number of packets in the jitter buffer 47 after completion of handover and confirmation that the packets are received from the handover destination approximately at predetermine intervals, the wireless communication apparatus 11 immediately returns to the standard reproduction speed Vst. When the number of packets does not exceed the predetermined amount, the wireless communication apparatus 11 returns to the standard reproduction speed Vat after the number of packets in the jitter buffer 47 exceeds the predetermine amount, that is, after $t=(Tst-Tc)/(Vst-V)$, Hence, according to the wireless communication apparatus 11 of the present embodiment, it is possible to reproduce the application at a constant reproduction speed close to the standard reproduction speed, by extending the time to spend to absorb the difference in the absolute delay times of the first wireless communication network 15 of the handover source and the second wireless communication network 16 of the handover destination, in comparison to a conventional case shown in FIG. 22 and FIG. 23. It enables handover from the first wireless communication network 15 to the second wireless communication network 16 without deteriorating the reproduction quality and the real-time property.

Third Embodiment

According to a third embodiment of the present invention, in the wireless communication apparatus 11 having the constitution as described in the first embodiment, the handover control unit 36 determines the handover schedule or cancels the handover schedule based on the communication quality obtained from the first wireless I/F 31 and the second wireless I/F 32. For example, when the communication quality obtained from the first wireless I/F 31 becomes equal or lower than the handover schedule determination threshold and, at that time, the communication quality obtained from the second wireless I/F 32 is equal to or higher than the communication quality obtained from the first wireless I/F 31 during the call forming a wireless link with the first wireless communication network 15, the handover control unit 36 determines the handover schedule to perform handover to the second wireless communication network 16 at the time the predetermined handover preparation time Tp passes, based on the communication quality obtained from the first wireless I/F 31, that is, determines to start preparation for handover.

When the communication quality obtained from the second wireless I/F 32 does not reach the communication quality obtained from the first wireless I/F 31 at the time when the communication quality obtained from the first wireless I/F 31 becomes equal to or lower than the handover schedule determination threshold, the handover control unit 36 predicts communication quality of the first wireless communication network 15 and the second wireless communication network 16 thereafter based on the corresponding communication quality. Then, the handover control unit 36 determines to start preparation for handover so as to perform handover to the second wireless communication network 16 when the handover preparation time Tp has passed and the predicted communication quality of the second wireless communication network 16 becomes equal or higher than the communication quality of the first wireless communication network 15.

When the handover control unit 36 determines the handover schedule, the handover control unit 36 obtains the handover preparation time Tp to start handover, a throughput of the handover destination after the handover preparation time Tp (after a scheduled time to execute handover), the downlink absolute delay time Tddn1 of the handover source in the wireless communication network currently being used (the first wireless communication network 15, in this case), and the downlink absolute delay time Tddn2 of the handover destination in the wireless communication network of the handover destination (the second wireless communication network 16, in this case). Then, the handover control unit 36 provides the obtained information as the required handover information, together with the information indicating that there is a handover schedule, to the telephone function unit 33. The telephone function unit 33 obtains a required bandwidth threshold of a softphone (application) from the entire control unit 53 at a start of the call, and provides the required bandwidth threshold from the handover information obtain unit 55 to the handover control unit 36.

Next, a method for obtaining the handover preparation time Tp and a method for obtaining the throughput of the handover destination by the handover control unit 36 are described. It is to be noted that the methods for obtaining the downlink absolute delay time Tddn1 of the handover source and the downlink absolute delay time Tddn2 of the handover destination are the same as those in the above embodiments and descriptions thereof are thus omitted.

(Method for Obtaining Handover Preparation Time Tp)

As described above, the handover preparation time Tp is obtained by different methods between a case where the communication quality of the handover destination is equal to or higher than that of the handover source at the time when the communication quality of the handover source becomes equal to or lower than the handover schedule determination threshold ((a) first method for obtaining handover preparation time) and a case where the communication quality of the handover destination does not reach the communication quality of the handover source at the time when the communication quality of the handover source becomes equal to or lower than the handover schedule determination threshold ((b) second method for obtaining handover preparation time).

(a) First Method for Obtaining Handover Preparation Time

In this case, in the same way as described in descriptions of FIGS. 4(a) and 4(b), for example, the handover preparation time Tp is calculated based on the change rate $\Delta Rs$ (slope) of the radio state (Rs) which determines the communication quality.

(b) Second Method for Obtaining Handover Preparation Time

Figures 12, 13:
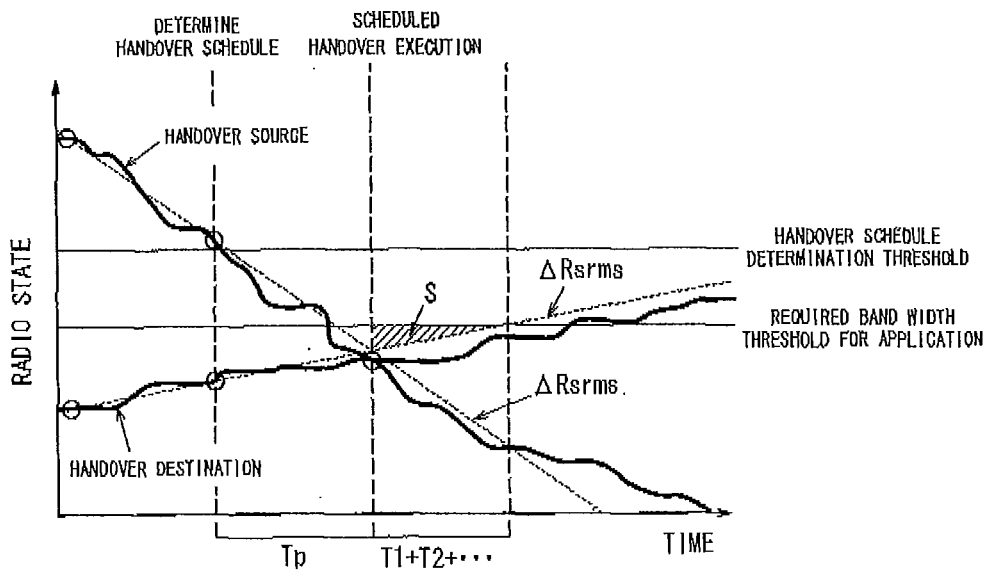
FIG. 12 shows a diagram for explaining a second method for obtaining a handover preparation time by a handover control unit of a wireless communication apparatus according to a third embodiment of the present invention.
FIG. 13 shows an exemplified conversion table of communication quality (radio state) and throughputs stored in the handover control unit of the wireless communication apparatus according to the third embodiment of the present invention.

In this case, as shown in FIG. 12, the average change rate $\Delta Rsrms$ of the handover source is calculated when the communication quality of the handover source becomes equal to or lower than the handover schedule determination threshold so as to predict the communication quality of the handover source thereafter, and the average change rate $\Delta Rsrms$ of the handover destination is also calculated so as to predict the communication quality of the handover destination thereafter. Thereby, a period from a time when the communication quality of the handover source becomes equal to or lower than the handover schedule determination threshold to a time when the predicted communication quality of the handover destination becomes equal to or higher than the predicted communication quality of the handover source is obtained as the handover preparation time Tp.

(Method for Obtaining Throughput of Handover Destination)

As the throughput of the handover destination, transition (each of predicted throughputs and their periods) of the throughput of the second wireless communication network 16 from a scheduled time to execute handover to a time when the throughput reaches the required bandwidth threshold of the application obtained from the telephone function unit 33 is predicted. For this reason, a conversion table of the communication quality (radio state) and the throughputs as shown in FIG. 13, for example, is previously stored in the handover control unit 36. The handover control unit 36, based on the communication quality after the scheduled handover execution, which is predicted from the average change rate $\Delta Rsrms$ at the determination of the handover schedule, for example, predicts the transition of the throughput of the second wireless communication network 16 after the scheduled handover execution until the throughput reaches the required bandwidth threshold of the application, from the conversion table in FIG. 13.

Here, as shown in FIGS. 4(a) and 4(b), for example, when a predicted throughput of the handover destination is equal to or higher than the required bandwidth threshold of the application at the scheduled time to execute handover, the predicted throughput and the period 0 are provided to the telephone function unit 33. In contrast, when the predicted throughput of the handover destination has not reach the required bandwidth threshold of the application at the scheduled time to execute handover as shown in FIG. 12, the telephone function unit 33 is provided with transition of the predicted throughput until the predicted throughput satisfies the required bandwidth threshold of the application, that is, predicted throughputs V1, V2, . . . , Vin in an area S shown by diagonal lines in FIG. 12, and time periods T1, T2, . . . , Tm corresponding to the respective predicted throughputs.

In addition, when the handover control unit 36 decides the handover schedule, the handover control unit 36 controls the communication processing unit 34 to execute the handover processing in the same manner as those in the above embodiments.

Figure 14:
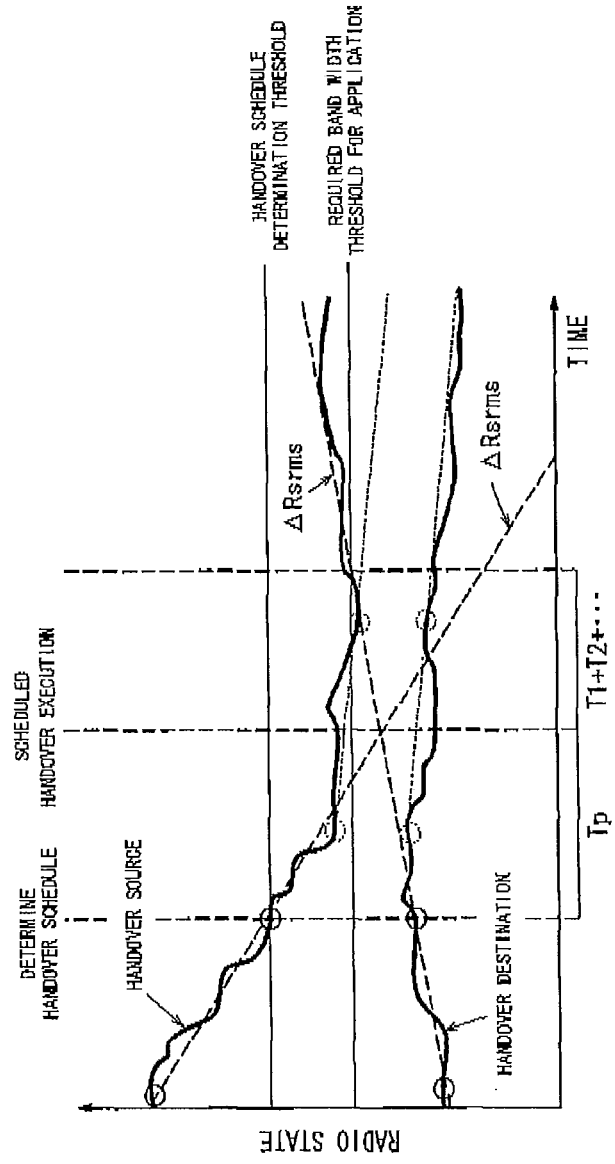
FIG. 14 shows a diagram illustrating an example of radio states of a handover source and a handover destination when a handover schedule is cancelled by the wireless communication apparatus according to the third embodiment.

In the wireless communication apparatus 11 according to the present embodiment, however, when the handover control unit 36 determines the handover schedule, the handover control unit 36 continues to monitor the communication quality of the first wireless communication network 15 and the second wireless communication network 16 thereafter and predicts communication quality at predetermined intervals. When a condition, in which the predicted communication quality of the first wireless communication network 15 of the handover source becomes better (exceeds) than the predicted communication quality of the second wireless communication network 16 after a predetermined time longer than the handover preparation time Tp, continues for longer than a predetermined period, as shown in FIG. 14, for example, the handover control unit 36 cancels the handover schedule and informs the telephone function unit 33 accordingly.

Accordingly, in the wireless communication apparatus 11 according to the present embodiment, the handover control unit 36 constitutes the determination unit for determining whether to start preparation for handover, the estimation unit for estimating handover preparation time, predicting the communication quality of the handover destination after scheduled handover execution and cancelling the handover schedule, and a measuring unit for measuring the respective delay times of the first wireless communication network 15 and the second wireless communication network 16.

Figure 15:
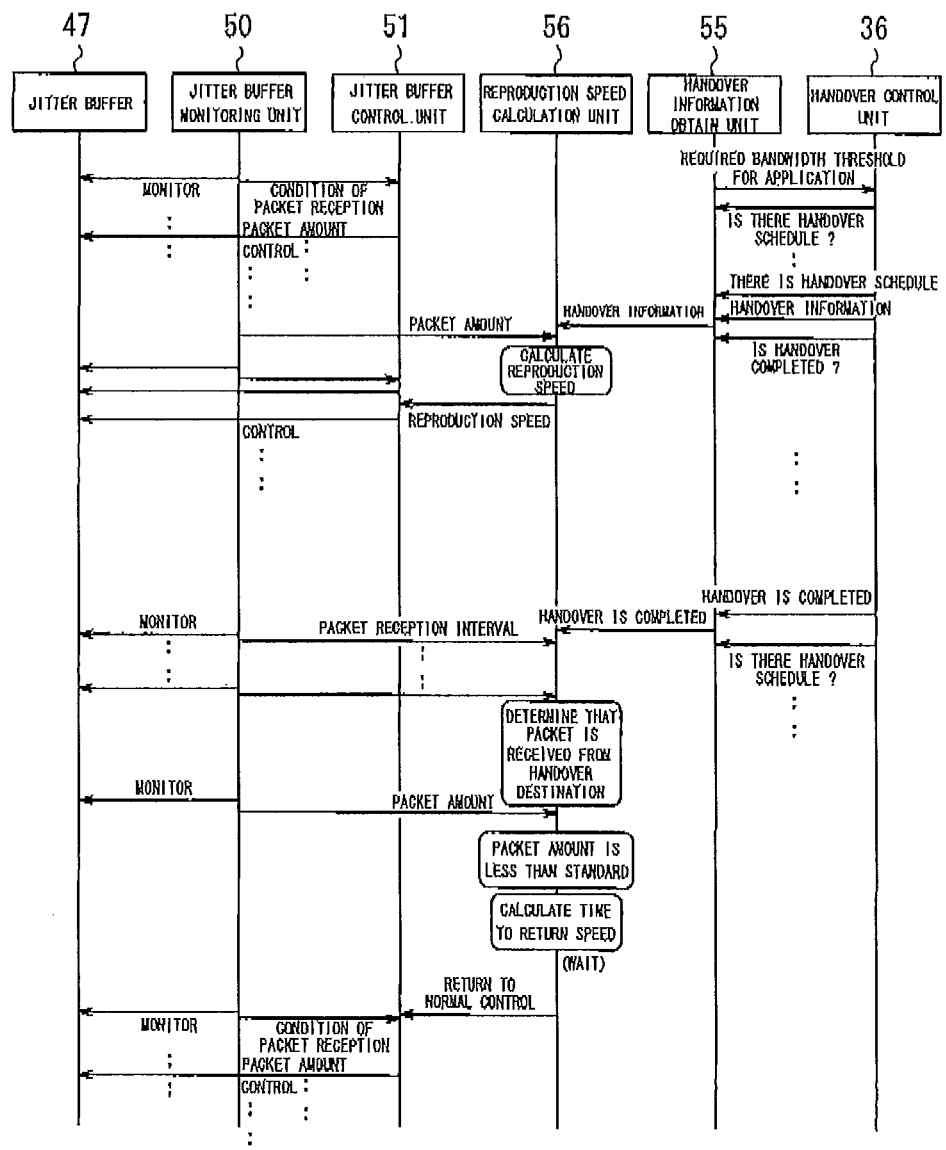
FIG. 15 shows a sequence diagram illustrating the operation of the main part of the telephone function unit shown in FIG. 3 when the wireless communication apparatus according to the third embodiment executes the handover schedule.

Next, an operation of the telephone function unit 33 of the wireless communication apparatus 11 according to the present embodiment is explained. FIG. 15 is a sequence diagram illustrating an operation of a main part of the telephone function unit 33. The handover information obtain unit 55 obtains the required bandwidth threshold of the softphone (application) from the entire control unit 53 at a start of the call and provides the required bandwidth threshold to the handover control unit 36. In addition, the handover information obtain unit 55 monitors the handover information from the handover control unit 36 at predetermined intervals during the call and, when obtaining the information indicating that there is a handover schedule, further obtains the handover preparation time Tp, the throughput of the handover destination, the downlink absolute delay time Tddn1 of the handover source, and the downlink absolute delay time Tddn2 of the handover destination, which are the required handover information from the handover control unit 36, and provides the required handover information obtained to the reproduction speed calculation unit 56.

Based on the required handover information obtained from the handover information obtain unit 55, the reproduction speed calculation unit 56 calculates a difference Ta (Ta=Tddn2−Tddn1) between the downlink absolute delay time (Tddn2) of the second wireless communication network 16 and the downlink absolute delay time (Tddn1) of the first wireless communication network 15 in the same manner as those in the above embodiments, and determines whether the difference Ta exceeds a predetermined value (>0).

When the absolute delay time difference Ta exceeds the predetermined value, that is, when the delay time of the second wireless communication network 16 of the handover destination is longer than the delay time of the first wireless communication network 15 of the handover source by the predetermined value or more, the reproduction speed calculation unit 56 calculates the reproduction speed V of the received packets in the jitter buffer 47 from the following formula 7 based on the required handover information obtained and the result of monitoring the jitter buffer 47 by the jitter buffer monitoring unit 50. It is to be noted that Vst indicates the standard reproduction speed and Tc indicates the time corresponding to the number of packets (data amount) in the jitter buffer 47 at the time of receiving the information indicating that there is a handover schedule in the formula 7, in the same manner as the above formulas 4, 6. The reproduction speeds V, Vst are shown by time ratio (time/time) and Vst=1, for example.

[Formula 7]

$$V = (Tc + Tp \times Vst + V1 \times T1 + V2 \times T2 + \ldots + Vm \times Tm)/(Tp + Ta + T1 + T2 + \ldots + Tm) \quad (7)$$

As shown in FIGS. 4(a) and 4(b); for example, when the predicted throughput of the handover destination is equal to or higher than the required bandwidth threshold of the application at the scheduled time to execute handover, the predicted throughput and the period 0 are obtained from the handover control unit 36, thereby the periods T1, T2, . . . , Tm become zero in the above formula 7, in this case. Accordingly, the reproduction speed V in this case is calculated by the same formula as the above formula 6 in the second embodiment and the number of packets in the jitter buffer 47 becomes zero at the time when packet reception from the handover destination is started.

In contrast, when the predicted throughput of the handover destination after scheduled handover execution does not fall the required bandwidth threshold of the application, the predicted throughputs V1, V2, . . . , Vm of the region not fulfilling the required bandwidth threshold and corresponding periods T1, T2, . . . , Tm are obtained from the handover control unit 36. Thus, the reproduction speed V is calculated by the above formula 7, in this case, and the number of packets in the jitter buffer 47 becomes zero at the time when the predicted throughput satisfies the required bandwidth threshold of the application.

The reproduction speed calculation unit 56 provides the reproduction speed V calculated to the jitter buffer control unit 51. Thereby, the jitter buffer control unit 51 controls read-out of the received packets from the jitter buffer 47 so as to reproduce the received packets at the reproduction speed V, which is slower than the standard reproduction speed Vst. Reproduction speed control of the received packets by the jitter buffer control unit 51 may be performed by the first reproduction speed control method or the second reproduction speed control described in the first embodiment.

Subsequently, when the handover information obtain unit 55 obtains the handover completion information from the handover control unit 36, the reproduction speed calculation unit 56 obtains reception intervals of the packets from the jitter buffer monitoring unit 50 at certain intervals. Then, the reproduction speed calculation unit 56 calculates an average value of the reception intervals at a certain time and monitors whether the difference between the average value of the reception intervals of packets calculated and a standard reception interval of the VoIP application falls within a threshold.

When the difference falls within the threshold as a result, the reproduction speed calculation unit 56 determines that a packet is received from the handover destination and obtains the number of packets (data amount) in the jitter buffer 47 at that time from the jitter buffer monitoring unit 50, and then determines whether the number of packets obtained exceeds a predetermined amount.

When the number of packets in the jitter buffer 47 does not exceed the predetermined amount, the reproduction speed calculation unit 56 instructs the jitter buffer control unit 51 to return to the normal reproduction speed control after the number of packets exceeds the predetermined amount, that is, after t=(Tst−Tc)/(Vst−V). In contrast, when the number of packets in the jitter buffer 47 exceeds the predetermined amount, the reproduction speed calculation unit 56 instructs the jitter buffer control unit 51 to retain to the normal reproduction speed control. That is, when the reproduction speed calculation unit 56 determines that a packet is received from the handover destination, the jitter buffer control unit 51 controls read-out from the jitter buffer 47 so as to return to the standard reproduction speed Vst when the number of packets in the jitter buffer 47 exceeds the predetermined amount.

Figure 16:
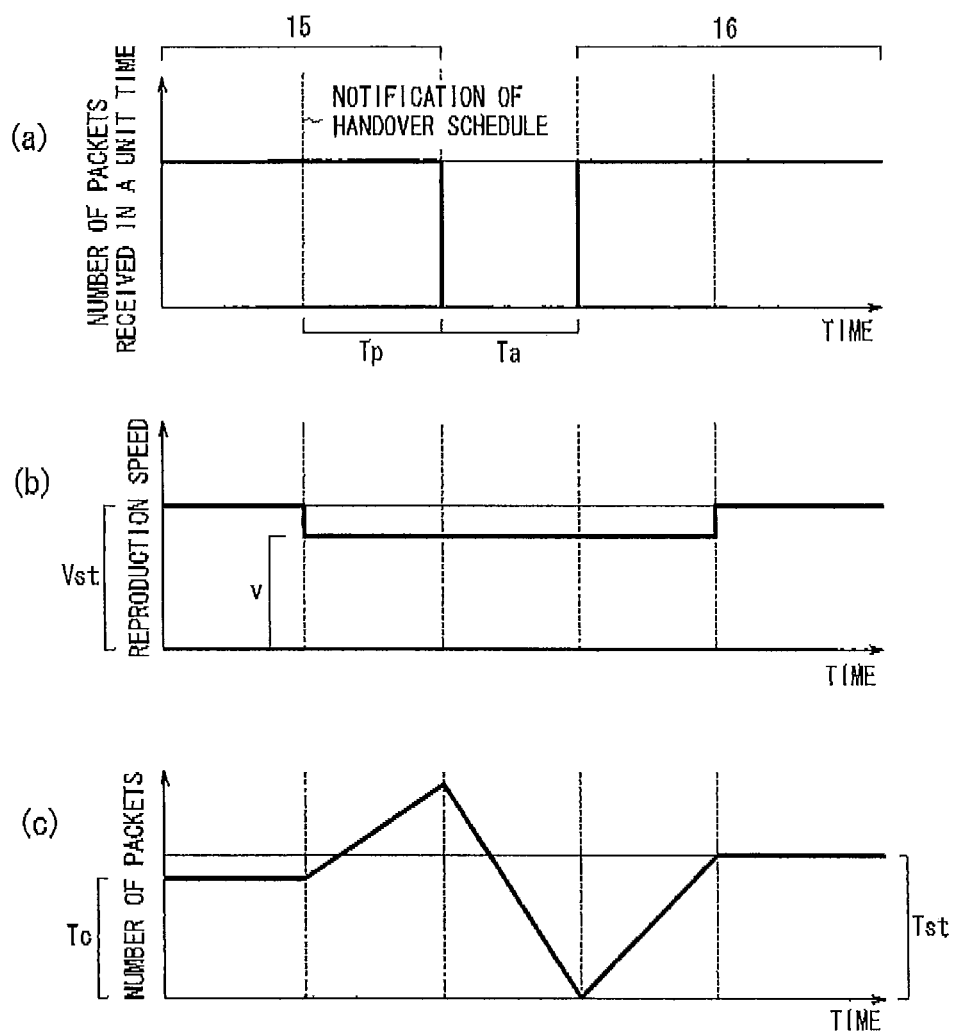
FIG. 16 shows diagrams illustrating one example of the control of the jitter buffer by the telephone function unit shown in FIG. 3 when the wireless communication apparatus according to the third embodiment executes the handover schedule.
Figure 17:
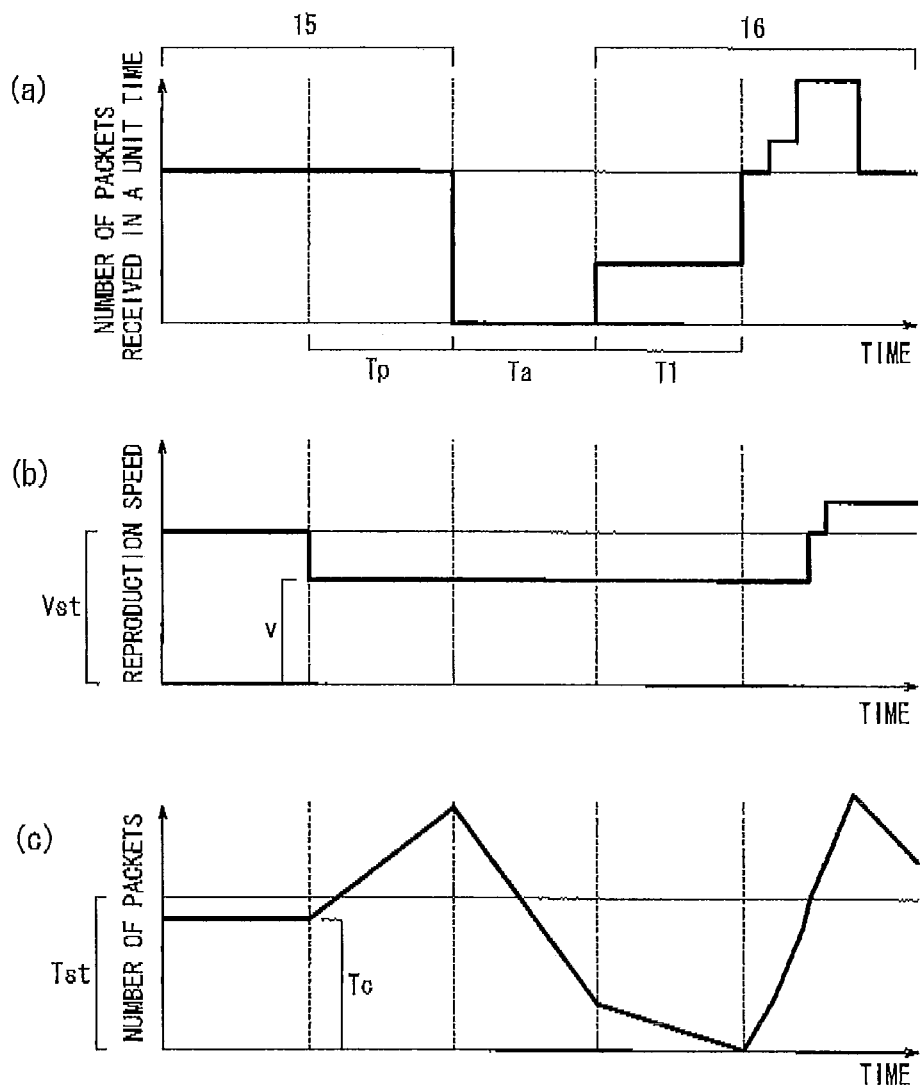
FIG. 17 shows diagrams illustrating another example of control of the jitter buffer by the telephone function unit shown in FIG. 3 when the wireless communication apparatus according to the third embodiment executes the handover schedule.

FIG. 16 and FIG. 17 are diagrams illustrating exemplified controls of the jitter buffer 47 according to the present embodiment. FIG. 16 shows an example of the control by the reproduction speed V in the above formula 6, whereas FIG. 17 shows an example of the control by the reproduction speed V in the above formula 7. In each of the figures, (a) shows the number of packets received by the jitter buffer 47 in the unit time, (b) shows the reproduction speed (read-out intervals) of the packets from the jitter buffer 47, and (c) shows the number of packets in the jitter buffer 47.

As obvious in FIG. 16, when the predicted throughput of the handover destination is equal to or higher than the required bandwidth threshold of the application at the scheduled time to execute handover, the reproduction speed V of the application becomes slower than the standard reproduction speed Vst after the handover schedule is notified, such that the number of packets in the jitter buffer 47 becomes zero at the time of starting reception of packets from the handover destination, in the same manner as that in the second embodiment. It is thus possible to absorb the difference from the absolute delay time of the handover destination by taking a long time, which makes the reproduction speed V much closer to the standard reproduction speed Vst.

In addition, as obvious in FIG. 17, when the predicted throughput of the handover destination has not reached the required bandwidth threshold of the application at the scheduled time to execute handover, the reproduction speed V of the application becomes slower than the standard reproduction speed Vs after the handover schedule is notified, such that the number of packets in the jitter buffer 47 becomes zero at the time when the predicted throughput reaches the required bandwidth threshold of the application. Thus, since the difference from the absolute delay time of the handover destination is absorbed taking longer time than that in the case shown in FIG. 16, as the radio state of the handover destination is worse in this case, it can reduce the difference of the reproduction speed V from the standard reproduction speed Vst, in the same manner as that that in FIG. 16. Thereby, it is possible to perform handover from the first wireless communication network 15 to the second wireless communication network 16 having a longer absolute delay time, without deteriorating the communication quality and the real-time property.

Figure 18:
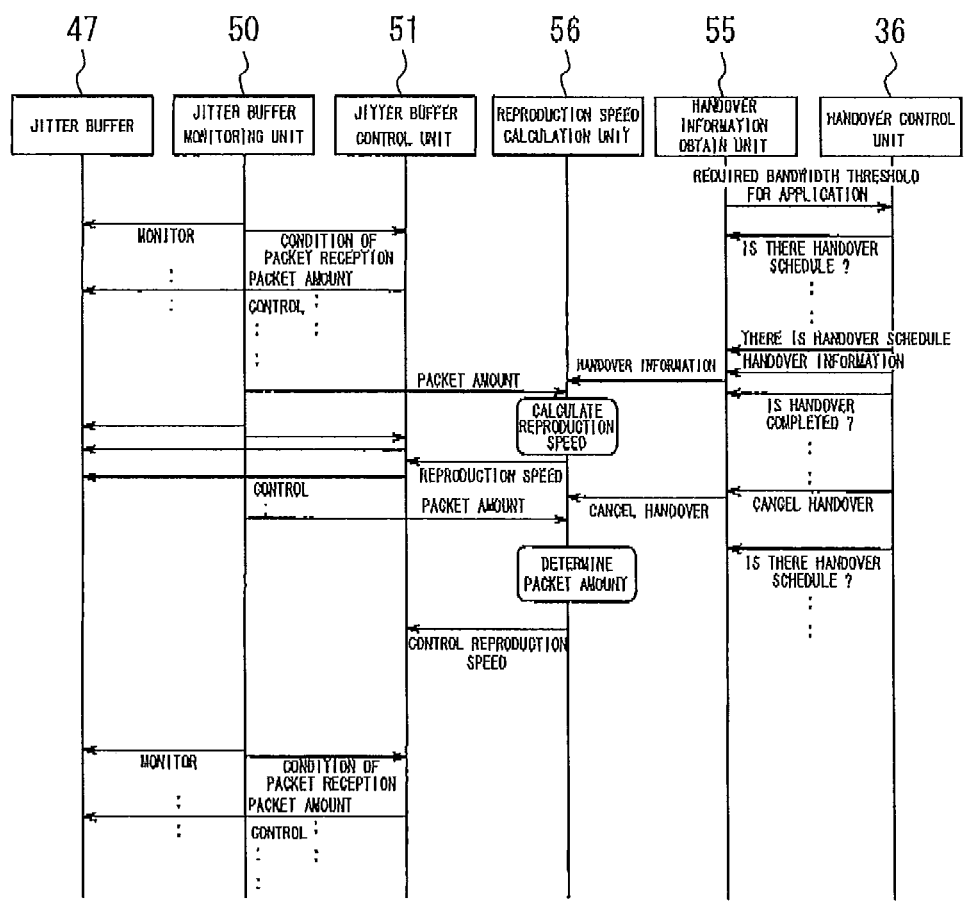
FIG. 18 shows a sequence diagram illustrating the operation of the main part of the telephone function unit shown in FIG. 3 when the wireless communication apparatus according to the third embodiment cancels the handover schedule.

Next, an operation when the cancel information of the handover schedule is obtained after the telephone function unit 33 obtains the information indicating that there is a handover schedule and starts control of the reproduction speed is described with reference to a sequence diagram shown in FIG. 18. In such a case, when the reproduction speed calculation unit 56 obtains the cancel information of the handover schedule from the handover information obtain unit 55, the reproduction speed calculation unit 56 first obtains the number of packets in the jitter buffer 47 at that time from the jitter buffer monitoring unit 50 and determines whether the number of packets is a standard amount.

When the number of packets in the jitter buffer 47 is equal to or less than the standard amount as a result, the reproduction speed calculation unit 56 instructs the jitter buffer control unit 51 to return the reproduction speed control of the jitter buffer 47 to the normal reproduction speed control. In contrast, when the number of packets in the jitter buffer 47 exceeds the standard amount as the result, the reproduction speed calculation unit 56 instructs the jitter buffer control unit 51 so as to reproduce the packets at a predetermined speed Vf faster than the standard reproduction speed Vst and return to the normal reproduction speed control after a time t calculated by use of a formula 8 stated below. In the formula 8, the predetermined speed Vf is calculated by a formula, reproduction speed/standard reproduction speed Vst×100, which is a ratio to the standard reproduction speed Vst. In a case to reproduce the packets at such high speed as the predetermined speed Vf, the intervals to read out (intervals to extract) packets from the jitter buffer 47 are set to be short as Ti/Vf (Ti: standard read-out interval, Vf: ratio to standard reproduction speed Vst).

[Formula 8]

$$t=(Tst-Tc)/(Vst-Vf) \quad (8)$$

Figure 19:
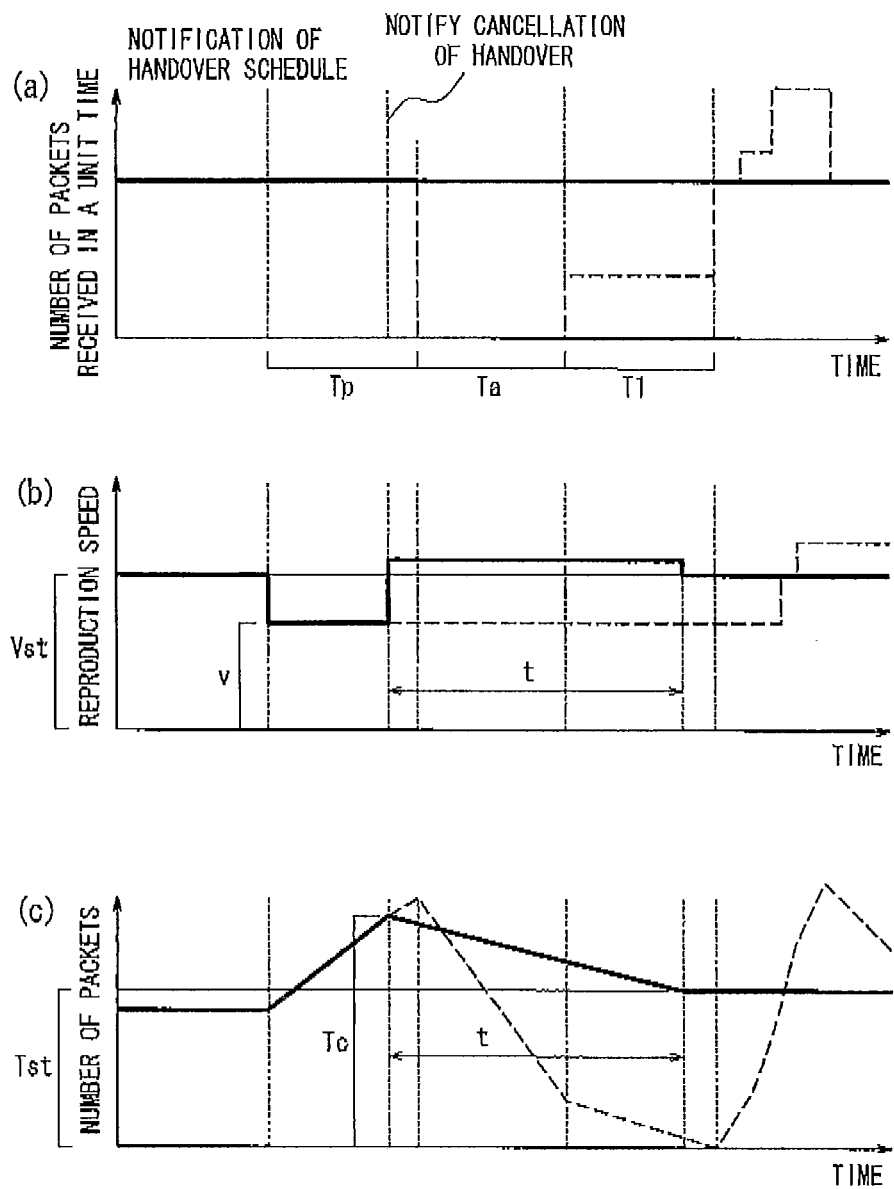
FIG. 19 shows diagrams illustrating one example of control of the jitter buffer by the telephone function unit shown in FIG. 3 when the wireless communication apparatus according to the third embodiment cancels the handover schedule.
Figure 20:
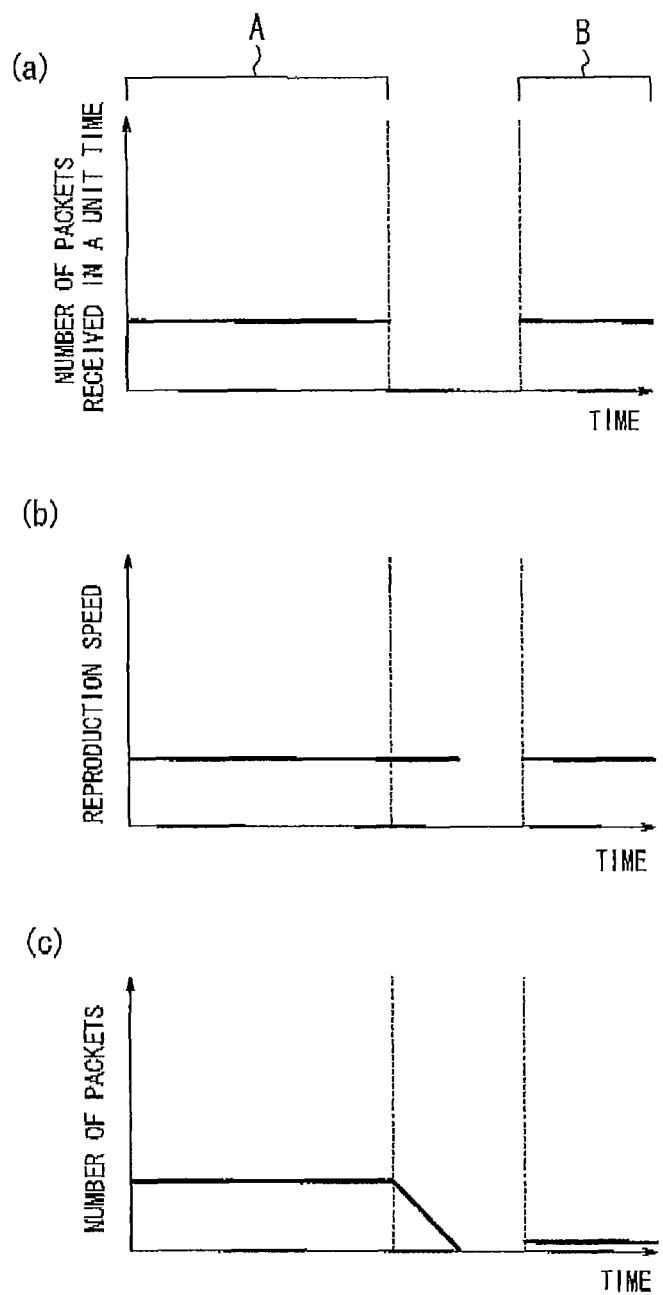
FIG. 20 shows diagrams for explaining one example of a conventional control method of the jitter buffer.
Figure 21:
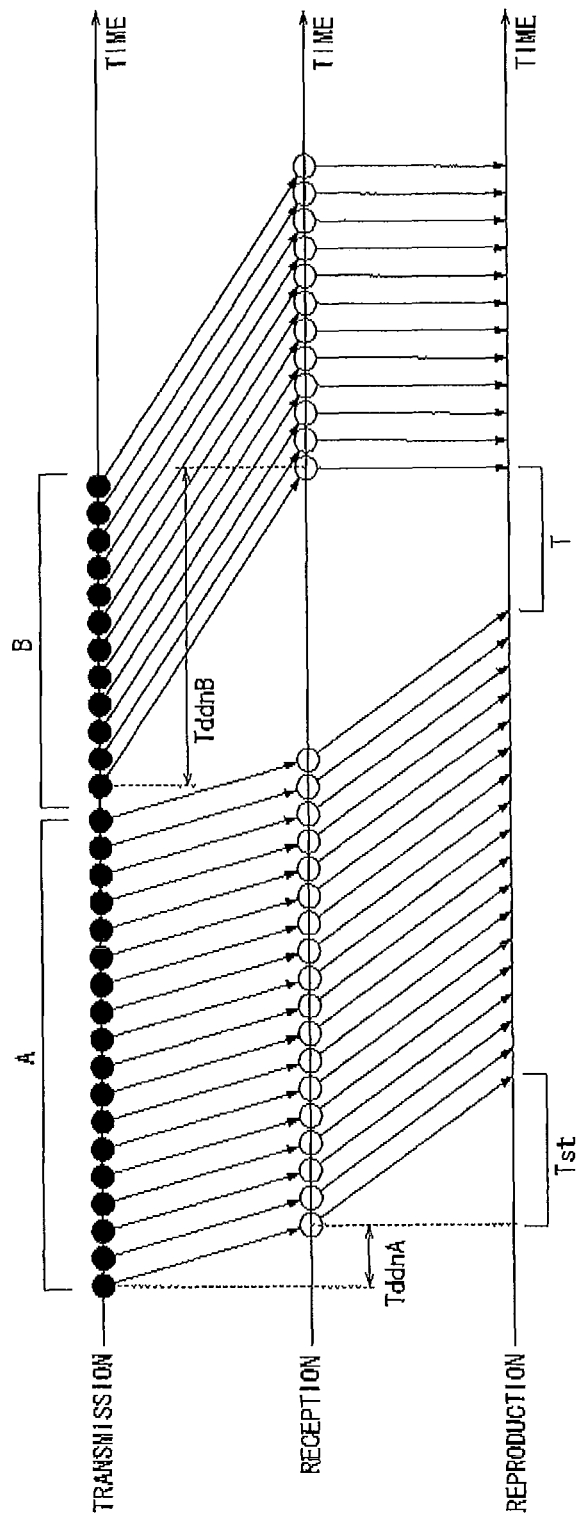
FIG. 21 shows a diagram illustrating flows of packets by the control method shown in FIG. 20.

FIG. 19 shows diagrams illustrating an example of a control of the jitter buffer 47 in a case where the number of the packets in the jitter buffer 47 exceeds the standard amount when the handover schedule is cancelled in the wireless communication apparatus 11 according to the present embodiment. In FIG. 19, (a) shows the number of packets received by the jitter buffer 47 in the unit time, (b) shows the reproduction speed (read-out intervals) of the packets from the jitter buffer 47, and (c) shows the number of packets in the jitter buffer 47. Since other constitutions and operations are the same as those in the first embodiment, the descriptions thereof are thus omitted.

As described above, according to the wireless communication apparatus 11 according to the present embodiment, in order to perform handover from the first wireless communication network 15 having the absolute delay time Tddn1, which is short, to the second wireless communication network 16 with the absolute delay time Tddn2, which is long, the throughput of the handover destination after scheduled handover execution is predicted in advance and, in consideration of the predicted throughput, the reproduction speed from the time of determining the handover schedule is calculated. Thus, even not only when the radio state after execution of handover is good but also when the radio state after execution of handover is bad, it is possible to reproduce the application at the constant speed much closer to the standard reproduction speed than the reproduction speed in the conventional cases shown in FIG. 22 and FIG. 23, by extending the time to absorb the difference in the delay times of the first wireless communication network 15 of the handover source and the second wireless communication network 16 of the handover destination. It is thus possible to perform handover from the first wireless communication network 15 to the second wireless communication network 16 without deteriorating the reproduction quality and the real-time property.

It is to be understood that the present invention is not limited to the above embodiments but may be varied or altered in a multiple of manners. For example, the present invention is applicable not only to the wireless communication apparatus to execute the VoIP application but also to a wireless communication apparatus to execute an application for real-time communication such as streaming multimedia data of images, music and the like. In such a case, the telephone function unit is replaced with a multimedia function unit having a similar jitter buffer control function in an execution unit of the application.

The invention claimed is:

1. A wireless communication apparatus comprising:
a wireless communication unit for executing wireless communication by connecting to a first wireless communication network and a second wireless communication network different from the first wireless communication network;
an execution unit for executing an application for real-time communication via the wireless communication unit;
a communication quality obtain unit for obtaining communication quality of a wireless link of the first wireless communication network during execution of the application by connecting to the first wireless communication network;
a determination unit for determining whether to start preparation for handover from the first wireless communication network to the second wireless communication network based on the communication quality obtained by the communication quality obtain unit;
an estimation unit, when the determination unit determines to start preparation for handover during execution of the application, for estimating a handover preparation time based on the communication quality obtained by the communication quality obtain unit, wherein the handover preparation time is the time from the determination of preparation for handover to the start of handover;

a measuring unit for measuring a delay time of each of the first wireless communication network and the second wireless communication network when the determination unit determines to start preparation for handover; and a control unit for controlling a reproduction speed of the application by the execution unit based on the handover preparation time estimated by the estimation unit and the delay time of each of the first wireless communication network and the second wireless communication network measured by the measuring unit.

2. The wireless communication apparatus according to claim 1, wherein the control unit compares the delay time of the first wireless communication network and the delay time of the second wireless communication network and, when the delay time of the second wireless communication network is longer than the delay time of the first wireless communication network by a predetermined time or more, slows the reproduction speed of the application by the execution unit.

3. The wireless communication apparatus according to claim 2, wherein the control unit slows the reproduction speed of the application by the execution unit after starting preparation for handover.

4. The wireless communication apparatus according to claim 2, wherein the execution unit is provided with a jitter buffer and a jitter buffer monitoring unit for monitoring data amount in the jitter buffer, and the control unit, when the data amount in the jitter buffer monitored by the jitter buffer monitoring unit exceeds a predetermined amount after completion of handover to the second wireless communication network, returns the reproduction speed of the application to a normal speed.

5. A wireless communication apparatus comprising:

a wireless communication unit for executing wireless communication by connecting to a first wireless communication network and a second wireless communication network different from the first wireless communication network;

an execution unit having a jitter buffer and a jitter buffer monitoring unit for monitoring data amount in the jitter buffer and for executing an application for real-time communication via the wireless communication unit;

a communication quality obtain unit for obtaining communication quality of a wireless link of the first wireless communication network during execution of the application by connecting to the first wireless communication network;

a determination unit for determining whether to start preparation for handover from the first wireless communication network to the second wireless communication network based on the communication quality obtained by the communication quality obtain unit;

an estimation unit, when the determination unit determines to start preparation for handover during execution of the application, for estimating a handover preparation time based on the communication quality obtained by the communication quality obtain unit, wherein the handover preparation time is the time from the determination of preparation for handover to the start of handover;

a measuring unit for measuring a delay time of each of the first wireless communication network and the second wireless communication network when the determination unit determines to start preparation for handover; and a control unit for controlling to slow a reproduction speed of the application by the execution unit based on the handover preparation time estimated by the estimation unit, the delay time of each of the first wireless communication network and the second wireless communication network measured by the measuring unit, and the data amount in the jitter buffer monitored by the jitter buffer monitoring unit at a point when the determination unit determines to start preparation for handover.

6. The wireless communication apparatus according to claim 5, wherein the control unit slows the reproduction speed of the application by the execution unit such that the data amount in the jitter buffer becomes zero at a time to start receiving data from the second wireless communication network.

7. The wireless communication apparatus according to claim 6, wherein the control unit compares the delay time of the first wireless communication network and the delay time of the second wireless communication network and, when the delay time of the second wireless communication network is longer than the delay time of the first wireless communication network by a predetermined time or more, slows the reproduction speed of the application by the execution unit.

8. The wireless communication apparatus according to claim 7, wherein the control unit slows the reproduction speed of the application by the execution unit after starting preparation for handover.

9. The wireless communication apparatus according to claim 8, wherein the control unit, when the data amount in the jitter buffer monitored by the jitter buffer monitoring unit exceeds a predetermined amount after completion of handover to the second wireless communication network, returns the reproduction speed of the application to a normal speed.

10. A wireless communication apparatus comprising:

a wireless communication unit for executing wireless communication by connecting to a first wireless communication network and a second wireless communication network different from the first wireless communication network;

an execution unit having a jitter buffer and a jitter buffer monitoring unit for monitoring data amount in the jitter buffer and for executing an application for real-time communication via the wireless communication unit;

a communication quality obtain unit for obtaining communication quality of wireless links of the first wireless communication network and the second wireless communication network during execution of the application by connecting to the first wireless communication network;

a determination unit for determining whether to start preparation for handover from the first wireless communication network to the second wireless communication network based on the communication quality obtained by the communication quality obtain unit;

an estimation unit, when the determination unit determines to start preparation for handover during execution of the application for estimating a handover preparation time and communication quality of the second wireless communication network after scheduled handover execution, based on the communication quality obtained by the communication quality obtain unit, wherein the handover preparation time is the time from the determination of preparation for handover to the start of handover;

a measuring unit for measuring a delay time of each of the first wireless communication network and the second wireless communication network when the determination unit determines to start preparation for handover; and a control unit for controlling a reproduction speed of the application by the execution unit based on the handover preparation time estimated by the estimation unit, the communication quality of the second wireless communication network after scheduled handover execution predicted by the estimation unit, the delay time of each of the first wireless communication network and the second wireless communication network measured by the measuring unit, and the data amount in the jitter buffer monitored by the jitter buffer monitoring unit at a time when the determination unit determines to start preparation for handover.

11. The wireless communication apparatus according to claim 10, wherein the control unit compares the delay time of the first wireless communication network and the delay time of the second wireless communication network and, when the delay time of the second wireless communication network is longer than the delay time of the first wireless communication network by a predetermined time or more, slows the reproduction speed of the application by the execution unit.

12. The wireless communication apparatus according to claim 11, wherein the control unit slows the reproduction speed of the application by the execution unit after starting preparation for handover.

13. The wireless communication apparatus according to claim 12, wherein the estimation unit estimates transition of throughput of the second wireless communication system until it reaches a required bandwidth threshold to execute the application as the communication quality of the second wireless communication network after scheduled handover execution, and the control unit controls the reproduction speed of the application by the execution unit such that the data amount in the jitter buffer becomes zero at a time to start reception of data from the second wireless communication network if the throughput predicted by the estimation unit reaches already the required bandwidth threshold at a scheduled time to execute handover, and controls the reproduction speed of the application by the execution unit such that the data amount in the jitter buffer becomes zero at a time when the predicted throughput reaches the required bandwidth threshold if the throughput predicted by the estimation unit does not reach the required bandwidth threshold at the scheduled time to execute handover.

14. The wireless communication apparatus according to claim 12, wherein the estimation unit, after determination to start preparation for handover by the determination unit, predicts the communication quality of each of the first wireless communication network and the second wireless communication network based on corresponding communication quality obtained by the communication quality obtain unit at different timings, and notifies the control unit of cancellation of preparation for the handover if the predicted communication quality of the first wireless communication system exceeds the predicted communication quality of the second wireless communication system after a predetermined time exceeding the handover preparation time, and the control unit, when being notified of cancellation of preparation for the handover by the estimation unit, controls so as to return the reproduction speed of the application by the execution unit to a normal reproduction speed.

* * * * *